United States Patent
Zhou et al.

(10) Patent No.: US 11,797,081 B2
(45) Date of Patent: Oct. 24, 2023

(54) METHODS, DEVICES AND MEDIA FOR INPUT/OUTPUT SPACE MAPPING IN HEAD-BASED HUMAN-COMPUTER INTERACTIONS

(71) Applicants: Wei Zhou, Richmond Hill (CA); Mona Hosseinkhani Loorak, Markham (CA); Ghazaleh Saniee-Monfared, Toronto (CA); Sachi Mizobuchi, Toronto (CA); Xiu Yi, Thornhill (CA); Pourang Polad Irani, Winnipeg (CA); Jian Zhao, Waterloo (CA); Wei Li, Markham (CA)

(72) Inventors: Wei Zhou, Richmond Hill (CA); Mona Hosseinkhani Loorak, Markham (CA); Ghazaleh Saniee-Monfared, Toronto (CA); Sachi Mizobuchi, Toronto (CA); Xiu Yi, Thornhill (CA); Pourang Polad Irani, Winnipeg (CA); Jian Zhao, Waterloo (CA); Wei Li, Markham (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 35 days.

(21) Appl. No.: 17/408,201

(22) Filed: Aug. 20, 2021

(65) Prior Publication Data
US 2023/0059153 A1 Feb. 23, 2023

(51) Int. Cl.
*G06F 3/01* (2006.01)
*G06F 3/04847* (2022.01)
(Continued)

(52) U.S. Cl.
CPC ............ *G06F 3/012* (2013.01); *G06F 3/013* (2013.01); *G06F 3/017* (2013.01); *G06F 3/03* (2013.01);
(Continued)

(58) Field of Classification Search
None
See application file for complete search history.

(56) References Cited

U.S. PATENT DOCUMENTS

2004/0240708 A1* 12/2004 Hu ..................... G06F 3/012
382/103
2013/0007672 A1* 1/2013 Taubman .............. G06F 3/0482
715/863
(Continued)

FOREIGN PATENT DOCUMENTS

WO 2019223889 A1 11/2019

OTHER PUBLICATIONS https://www.microsoft.com/en-us/hololens.
(Continued)

*Primary Examiner* — Amare Mengistu
*Assistant Examiner* — Sarvesh J Nadkarni

(57) ABSTRACT

Methods, devices, and media are disclosed for mapping of input and output spaces in head-based human-computer interactions. In some embodiments, an end-to-end method is described for designing a head-based user interface, calibrating the interface to individual users, and interacting with a user in real time by mapping head-based user inputs to an output space in a way that optimizes the target selection efficiency of the interaction. Head orientation may be leveraged to define the mapping between the user input and the output space.

19 Claims, 10 Drawing Sheets

(51) Int. Cl.
*G06F 3/03* (2006.01)
*G06F 3/04842* (2022.01)

(52) U.S. Cl.
CPC ...... *G06F 3/04842* (2013.01); *G06F 3/04847* (2013.01)

(56) References Cited

U.S. PATENT DOCUMENTS

2014/0372944 A1  12/2014  Mulcahy et al.
2015/0192991 A1  7/2015  Dal Mutto et al.

OTHER PUBLICATIONS https://www.microsoft.com/en-us/store/locations/OculusRift.
Lee, Sangyoon, et al. "Evaluation of pointing techniques for ray casting selection in virtual environments." Third International conference on virtual reality and its application in industry. vol. 4756. International Society for Optics and Photonics, 2003.
https://reader.elsevier.com/reader/sd/pii/S0262885604000691?token=5D308D9D43FBC528.
https://support.apple.com/en-ca/guide/mac-.

\* cited by examiner

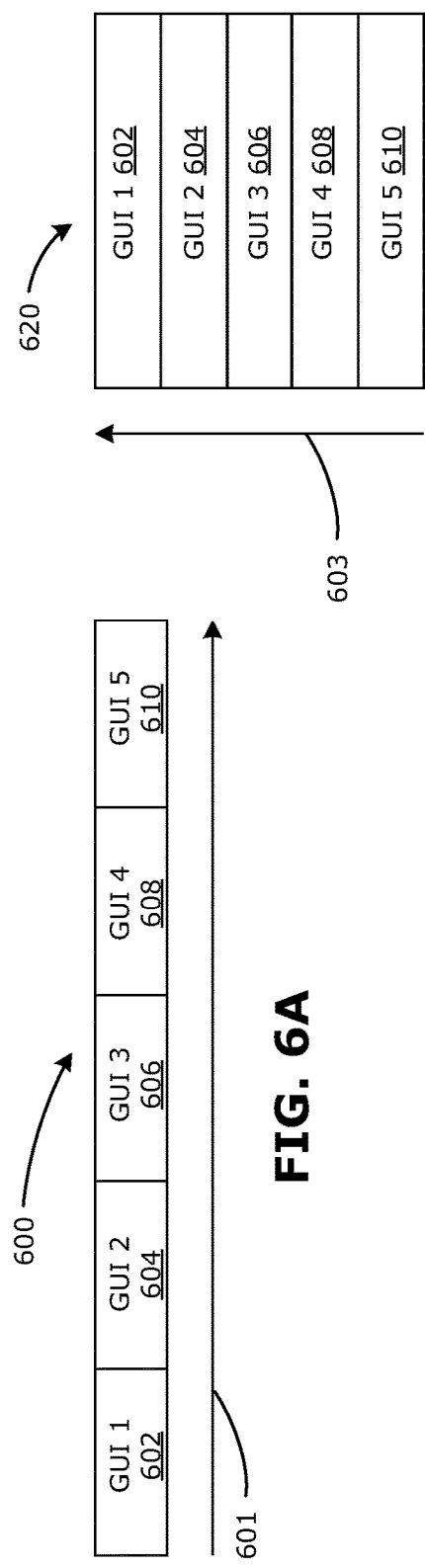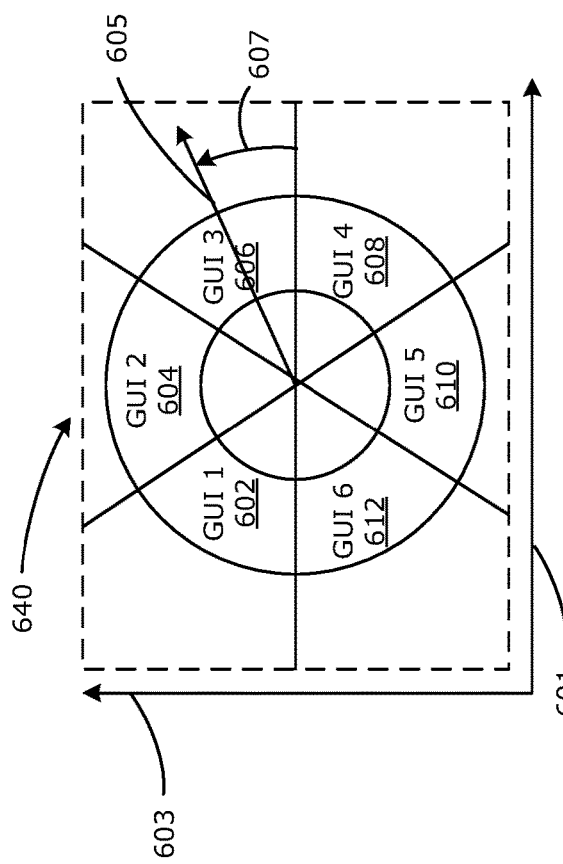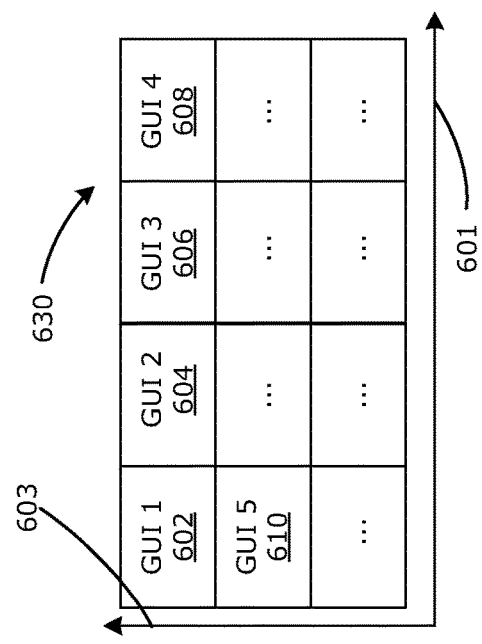

METHODS, DEVICES AND MEDIA FOR INPUT/OUTPUT SPACE MAPPING IN HEAD-BASED HUMAN-COMPUTER INTERACTIONS

RELATED APPLICATION DATA

This is the first patent application related to this matter.

FIELD

The present application generally relates to methods, devices, and processor-readable media for computer vision, and in particular to methods, devices, and processor-readable media for mapping of input and output spaces in head-based human-computer interactions.

BACKGROUND

Traditionally, a pointing device, such as a hand-held mouse, a finger or stylus, has been used by a user of an electronic device to control and provide data to an electronic device using physical gestures. For example, moving a hand-held mouse across a physical surface and activating switches (e.g., by pressing buttons) on the mouse enables a user to interact with (i.e., to control and provide data to) an electronic device. Similarly, a touch of a finger or stylus on a touch-sensitive surface of an electronic device, such as a trackpad or touchscreen display of the electronic device, and movement of the finger or stylus on the touch-sensitive surface enables a user to interact with (i.e., to control and provide data) to the electronic device. Movements of a pointing device on a surface are rendered on a display screen of the electronic device by movements of a pointer or cursors on the display screen. The control-display (CD) gain of a system describes the proportion between movements of the pointing device and the movements of the pointer or cursor on the display screen of the electronic device. The CD gain setting of an electronic device can be adjusted, for example, by the operating system of an electronic device or by a user of the electronic device. The CD gain thus defines a mapping of user input (e.g. movement of a pointing device) to an output space (e.g. displaying a position of a cursor on a display screen mapped to the movement of the pointing device based on the CD gain).

Because CD gain describes the proportion between movements of the pointing device and the movements of the pointer or cursor on the display screen of the electronic device, it also affects the behavior of the electronic device in response to those pointer movements. Thus, for example, an electronic device may be configured such that it to responds to a dragging motion of the pointer device in a particular context (e.g., an audio mixer application) by increasing the audio volume of an audio mixer module in proportion to the distance a volume slider is dragged by the pointer device. Thus, if the electronic device has a high CD gain setting and a user initiates a dragging action with a pointer device in the audio mixer context, a small motion by the user of the pointer device may result not only in a large movement of the pointer or cursor on screen but also a large movement of the audio volume slider, and therefore a large increase in the audio volume. Thus, CD gain not only affects the proportion between pointer device movement and what is displayed on the display screen, but also the proportion between the pointer device movement and the degree or magnitude of various commands executed by the electronic device (e.g., magnitude of audio volume increase).

In certain contexts (e.g., while cooking, while performing a medical operation, while driving a vehicle), users may not want or be able to touch a device for interaction. Users with disabilities may also be limited in their ability to interact with touch-based human-computer interfaces. Furthermore, recent computer vision advances have made head-based control of devices a feasible and desirable input modality for controlling and manipulating digital contents of distance devices, e.g., TVs or large public displays. Therefore, there is a need for hands-free user input techniques for human-computer interaction (HCI).

One hands-free HCI technique is based on head tracking and/or eye gaze tracking. Users with motor deficiencies may be able to send commands to a computer interface by moving their heads and/or eyes. Reliable tracking of head movements has been enabled by advancements in computer vision and sensing technologies. However, current head-tracking HCI systems leverage existing user interfaces to map user input (e.g., head movements) to an output space (e.g., movement of a cursor on a display), even though these systems were originally designed for mouse-based or touch-based input modalities. This leads to HCI that is not optimized for head input and may lead to reduced accuracy, reduced speed, discomfort, and difficulty of use.

There thus exists a need for techniques mapping head-based input to an output space that overcomes one or more of the shortcomings identified above.

SUMMARY

The present disclosure describes methods, devices, and media for adaptive mapping of input and output spaces in head-based human-computer interactions. In some embodiments, an end-to-end method is described for designing a head-based user interface, calibrating the interface to individual users, and interacting with a user in real time by mapping head-based user inputs to an output space in a way that optimizes the target selection efficiency of the interaction. Head orientation may be leveraged to define the mapping between the user input and the output space.

As used herein, the term "output space" refers to a virtual space in which different regions correspond to different commands issued to an electronic device, such as a command to display a cursor at a specific location on a display screen or a command to execute a software function associated with a graphical user interface (GUI) element displayed at the specific location. Thus, "output space" refers not only to a space defining user outputs (such as a collection of GUI elements displayed on a display screen or a collection of sounds played in response to different user inputs) but also a space defining commands issued to an electronic device.

As used herein, the term "span" refers to the size of a range of values, i.e. the difference between the maximum value of the range and the minimum value of the range. Thus, the span of the range of values [−5.4, 8.8] is 14.2.

As used herein, the term "orientation" refers to a rotational position of an object, such as a human head. A given orientation refers to a set of values for yaw, pitch, and roll angles relative to a neutral orientation. In the case of a human head, the "neutral orientation" refers to the orientation of a head facing straight ahead relative to the user's body, i.e. yawed neither left nor right, pitched neither up nor down, and rolled neither left nor right.

As used herein, the term "head rotation" refers to a dimension of rotation of a user's head. A head rotation may be a horizontal dimension of rotation (i.e. yaw, rotation about a vertical axis defined by the user's standing body) or a vertical dimension of rotation (i.e., pitch, rotation about a horizontal axis passing from the user's left side to the user's right side) of a user's head. In some embodiments, "head rotation" may refer to the roll (i.e. rotation about a horizontal axis passing from the front of the user to the back of the user) of a user's head. The axes defining yaw, pitch, and roll may be defined with reference to the neutral position of the head. The yaw may be positive when the head is turned to the left relative to the neutral position, and negative when the head is turned to the right relative the neutral position. The pitch may be positive when the head is angled upward relative to the neutral position, and negative when the head is angled downward relative the neutral position.

As used herein, the term "map" refers to a mathematical or computational function or process by which a value in a first domain may be associated with a value in a second domain. A map may be implemented, for example, by: looking up the value in the first domain in a lookup table to find a corresponding value in the second domain; by applying a mathematical function to the value in the first domain to compute the corresponding value in the second domain; or by performing a sequence of computational operations, using as input data representing the value in the first domain, to generate data representative of the corresponding value in the second domain.

As used herein, statements that a second item (e.g., a value, calculation, or determination) is "based on" a first item may mean that characteristics of the second item are affected or determined at least in part by characteristics of the first item. The first item may be considered an input to an operation or calculation, or a series of operations or calculations, that produces the second item as an output that is not independent from the first item.

As used herein, the term "frame" refers to a video frame, for example a two-dimensional digital image captured by a digital camera as part of a temporal sequence of such captured images.

In some aspects, the present disclosure describes a method for controlling a device based on an orientation of a user's head. The method comprises a number of steps. A first input-output map is obtained indicating, for each input range of a plurality of input ranges, a corresponding output range. Each input range comprises a range of values of a first head rotation. Each output range comprises a range of values of a first coordinate of an output space. Each input range has a span based on an expected selection error value for the input range. A frame captured by a camera is received. The frame is processed to detect a value of the first head rotation of the orientation of the user's head in the frame. The value of the first head rotation and the first input-output map are processed to compute a selected output range of the first input-output map. A selected function of the device is executed. The selected function is selected from a plurality of functions based on the selected output range of the first input-output map.

In some aspects, the present disclosure describes a device comprising a processor device and a memory storing machine-executable instructions thereon. The machine-executable instructions, when executed by the processor device, cause the device to perform a number of steps. A first input-output map is obtained indicating, for each input range of a plurality of input ranges, a corresponding output range. Each input range comprises a range of values of a first head rotation. Each output range comprises a range of values of a first coordinate of an output space. Each input range has a span based on an expected selection error value for the input range. A frame captured by a camera is received. The frame is processed to detect a value of the first head rotation of the orientation of the user's head in the frame. The value of the first head rotation and the first input-output map are processed to compute a selected output range of the first input-output map. A selected function of the device is executed. The selected function is selected from a plurality of functions based on the selected output range of the first input-output map.

In some aspects, the present disclosure describes a non-transitory processor-readable medium having machine-executable instructions stored thereon which, when executed by a processor device of a device, cause the device to perform a number of steps. A first input-output map is obtained indicating, for each input range of a plurality of input ranges, a corresponding output range. Each input range comprises a range of values of a first head rotation. Each output range comprises a range of values of a first coordinate of an output space. Each input range has a span based on an expected selection error value for the input range. A frame captured by a camera is received. The frame is processed to detect a value of the first head rotation of the orientation of the user's head in the frame. The value of the first head rotation and the first input-output map are processed to compute a selected output range of the first input-output map. A selected function of the device is executed. The selected function is selected from a plurality of functions based on the selected output range of the first input-output map.

In some aspects, the present disclosure describes a non-transitory processor-readable medium having instructions tangibly stored thereon. The instructions, when executed by a processor device, cause the processor device to perform the method steps described above.

By providing a mapping of head orientation inputs to user interface outputs that is based on a degree of precision of head movement in different sub-ranges of the user's neck's range of motion, described examples may provide a system supporting efficient and comfortable human-computer interaction (HCI).

In some examples, the device further comprises the camera and a display.

In some examples, each output range corresponds to a respective GUI element of a plurality of GUI elements displayed on a display screen of the device, such that a selected GUI element corresponds to the selected output range of the first input-output map. The plurality of GUI elements correspond to the plurality of functions, such that the selected function corresponds to the selected GUI element.

In some examples, the first input-output map comprises a continuous uneven angle allocation of the first head rotation to values of the first coordinate of the output space.

In some examples, the selected function, when executed by the device, causes the selected GUI element to be displayed on the display screen with a changed appearance. The method further comprises receiving further input, the further input including at least one of the following: blink input, voice input, gesture input, and head movement input. The head movement input comprises rotational movement of the user's head with respect to a second head rotation orthogonal to the first head rotation. The method further comprises, in response to receiving the further input, executing a further function of the device. The further function is selected from the plurality of functions based on the selected output range of the first input-output map and the further input.

In some examples, the method further comprises a number of additional steps. A plurality of additional frames captured by a camera are received. For each additional frame of the plurality of additional frames: the additional frame is processed to detect a respective value of the first head rotation of the orientation of the user's head in the additional frame, and the respective value of the first head rotation and the first input-output map are processed to compute a respective selected output range of the first input-output map. Based on the selected output range of the first input-output map and the respective selected output range of the first input-output map, for each additional frame of the plurality of additional frames, a looping pattern of the user's head is identified with respect to a selected GUI element of a plurality of GUI elements displayed on a display screen of the device. The selected function is selected from the plurality of functions based on the selected GUI element.

By detecting a looping pattern of the user's head movements to select a function, example embodiments may be able to use head control without relying on secondary input modalities such as head dwelling, blinking, voice, or hand-based user input.

In some examples, the first head rotation is yaw, and the first coordinate is a horizontal coordinate defined relative to the output space.

In some examples, the method further comprises obtaining a second input-output map indicating, for each input range of a plurality of input ranges, a corresponding output range. Each input range comprises a range of values of a second head rotation, the second head rotation being pitch. Each output range comprises a range of values of a second coordinate of an output space, the second coordinate being a vertical coordinate defined relative to the output space. Each input range has a span based on an expected selection error value for the input range. The method further comprises processing the frame to detect a value of the second head rotation of the orientation of the user's head in the frame, and processing the value of the second head rotation and the second input-output map to compute a selected output range of the second input-output map. The selected function is selected from the plurality of functions based on the selected output range of the first input-output map and the selected output range of the second input-output map.

In some examples, the first head rotation is pitch, and the first coordinate is a vertical coordinate defined relative to the output space.

In some examples, the expected selection error value for each input range is positively correlated with an angular distance of the input range from a neutral orientation of the head.

By using error data indicating higher error in sub-ranges farther from a neutral position, example embodiments may increase the precision and comfort of head-based HCI.

In some examples, the method further comprises receiving GUI design information indicating, for each GUI element of a plurality of GUI elements, an input range corresponding to the GUI element, the input range having a span based on the expected selection error value for the input range. The method further comprises processing the GUI design information to generate the first input-output map.

In some examples, the method further comprises receiving GUI design information indicating a plurality of GUI elements ordered sequentially with respect to the first coordinate of the output space. Error information indicating a relationship between expected selection error values and values of the first head rotation is received. The GUI design information and the error information are processed to generate the first input-output map such that the output space is segmented into the plurality of output ranges, each output range corresponding to a GUI element of the plurality of GUI elements, and the span of each input range of the first input-output map is based on the relationship between expected selection error values and values of the first head rotation.

In some examples, obtaining the first input-output map comprises: obtaining context information and processing the context information to generate the first input-output map. The context information comprises user body orientation information indicating an orientation of the user's body, and range of motion information indicating at least one range of motion for the user's head.

By using context information such as body orientation and range of motion information, the user's context may be taken into account to further optimize the precision, efficiency, and comfort of the HCI.

In some examples, obtaining the first input-output map comprises calibrating the first input-output map. A prompt to perform one or more head-pointing exercises is presented via an output device. A plurality of calibration frames captured by the camera are received. The plurality of calibration frames are processed to calibrate the first input-output map.

By calibrating the input-output map(s) to a specific user's capabilities and context, the precision, efficiency, and comfort of the HCI may be further adapted to a specific user and a specific user context.

BRIEF DESCRIPTION OF THE DRAWINGS

Reference will now be made, by way of example, to the accompanying drawings which show example embodiments of the present application, and in which:

FIG. 6A is a horizontal graphical user interface (GUI) showing five GUI elements arranged in a horizontal layout, showing an environment in which examples embodiments described herein may operate;

FIG. 6B is a vertical graphical user interface (GUI) showing five GUI elements arranged in a vertical layout, showing an environment in which examples embodiments described herein may operate;

FIG. 6C is a grid graphical user interface (GUI) showing GUI elements arranged in a grid layout, showing an environment in which examples embodiments described herein may operate;

FIG. 6D is a radial graphical user interface (GUI) showing GUI elements arranged in a radial layout, showing an environment in which examples embodiments described herein may operate;

Similar reference numerals may have been used in different figures to denote similar components.

DESCRIPTION OF EXAMPLE EMBODIMENTS

Figure 1:
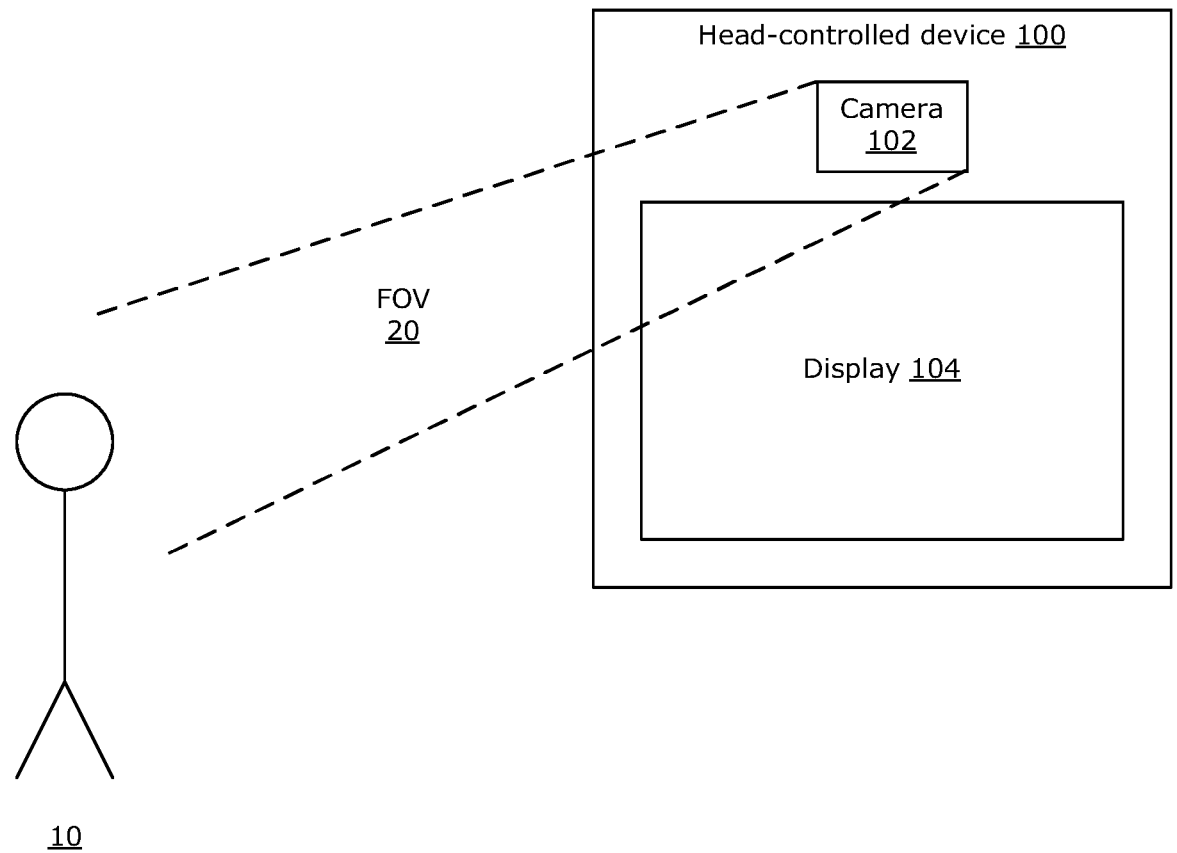
FIG. 1 is a block diagram illustrating a user interacting with an example device, according to examples described herein.

The present disclosure describes methods, devices, and media for adaptive mapping of input and output spaces in head-based human-computer interactions. Head-based user input techniques face certain constraints and considerations unique to a head-movement input modality. The human neck has a limited range of motion, and HCI principles dictate that users should be able to see the screen while performing head motions. Furthermore, research has shown that a user's head movements are more precise in certain sub-ranges of the neck's range of motion than in other sub-ranges.

These constraints and considerations may be taken into account when designing a user interface (UI), and when performing a mapping between head orientation as an input space and an output space of a head-controlled device, to create systems that support efficient and comfortable human-computer interaction (HCI). In some embodiments, various range-of-motion (ROM) constraints are taken into account in generating and applying an input-output map: these ROM constraints may be based at least in part on physical characteristics of an individual user and/or the context in which the HCI takes place.

In some embodiments, a user controls a cursor or focus point within an output space, such as the 2D space defined by the pixels of a display device, by rotating his or her head to select a graphical user interface (GUI) element, such as an icon or interactive screen region, on the display. Selected GUI elements may be activated or confirmed using a further user input, such as nodding, blinking, dwelling (i.e. keeping the head-controlled cursor positioned on the GUI element for a predetermined duration of time), voice, or any other method. In some embodiments, a GUI element may be selected and/or activated by performing a looping gesture with the head to encircle the selected GUI element.

The input-output map used in described embodiments is a non-uniform allocation of input space to the GUI elements of the output space. The non-uniform allocation may be based on human factors research findings, such as findings indicating that head movement precision is higher when the user's head is closer to a neutral orientation (i.e. facing directly ahead without pitching the head up or down). In some embodiments, the input-output map may be dynamically adapted to fit individual differences among users, based on a calibration step and/or an initialization step to determine the context of the HCI.

Example Devices and Systems

For simplicity, the present disclosure describes examples in the context of a head-controlled device having a display (e.g., a smart television (TV) or a computer monitor of a personal computer), and describes methods for interacting with and controlling the head-controlled device. However, it should be understood that the present disclosure is not limited to such embodiments, and the methods and devices described herein may be used for controlling of a variety of head-controlled devices in a variety of applications. For example, some embodiments of the methods and devices described herein may use other output devices, such as an audio speaker, to provide feedback information to users. In some embodiments, the operations and method steps described herein may be performed by a system including one or more physical devices in communication to perform the functions of the head-controlled device 100 of FIGS. 1-2 described below.

FIG. 1 shows an example of a user 10 interacting with a head-controlled device 100. In this simplified diagram, the head-controlled device 100 includes a digital camera 102 that captures a field-of-view (FOV) 20. The FOV 20 may include at least a portion of the user 10, in particular the head of the user 10, as discussed further below. The head-controlled device 100 may, instead of the digital camera 102, have another sensor capable of sensing hand gestures from the user 10, for example any image capturing device/sensor (e.g., an infrared image sensor). The head-controlled device 100 also includes a display device 104 (hereinafter referred to as display 104) for rendering visual information thereon, such as a video.

Figure 2:
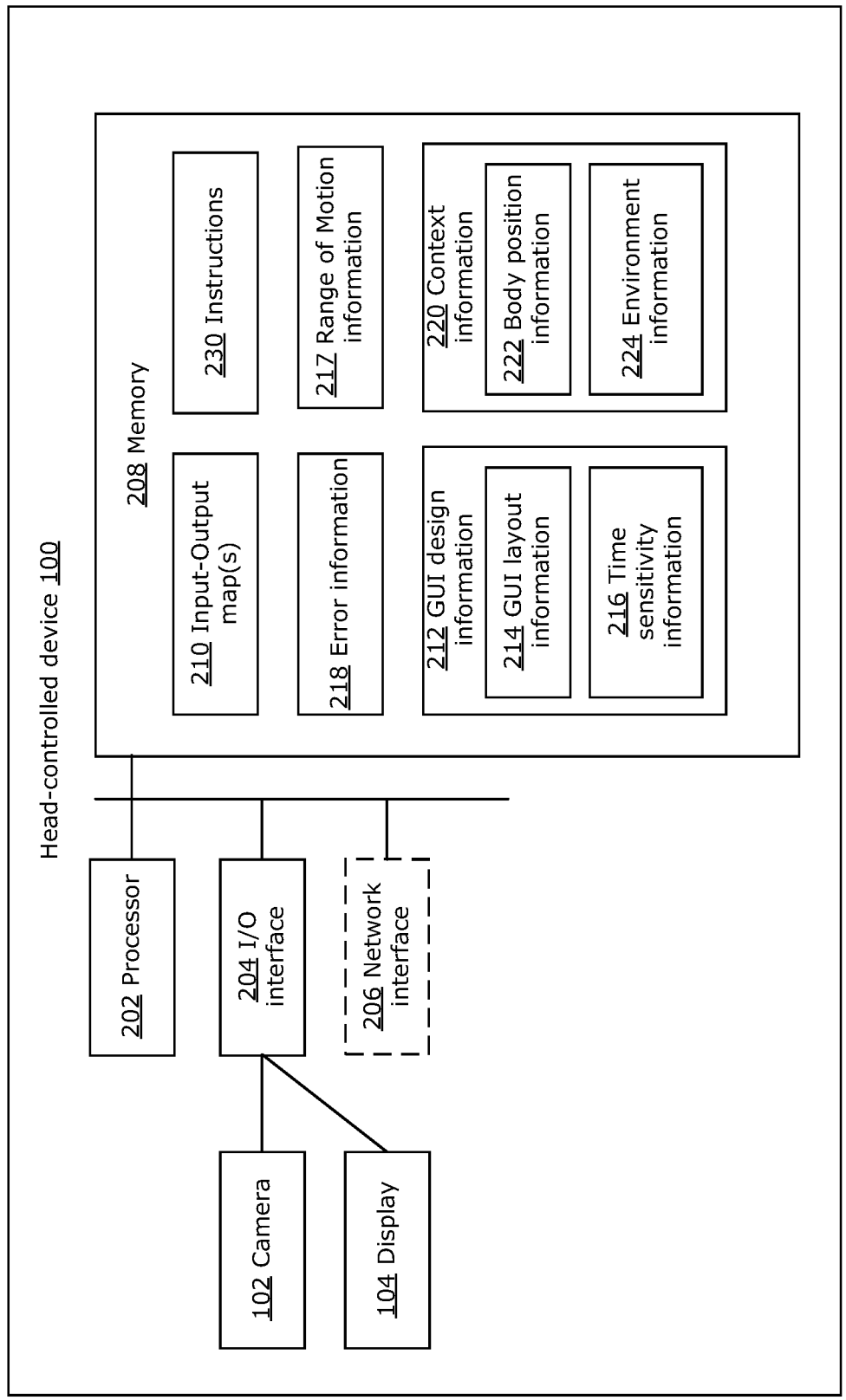
FIG. 2 is a block diagram illustrating some components of the example head-controlled device of FIG. 1.

FIG. 2 shows a block diagram of the head-controlled device 100. Although an example embodiment of the head-controlled device 100 is shown and discussed below, other embodiments may be used to implement examples disclosed herein, which may include components different from those shown. Although FIG. 2 shows a single instance of each component of the head-controlled device 100, there may be multiple instances of each component shown.

The head-controlled device 100 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors 202 may collectively be referred to as a "processor device". The head-controlled device 100 also includes one or more input/output (I/O) interfaces 204, which interfaces with input devices such as the digital camera 102 and output devices such as the display 104. The head-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing head-based input as a sequence of video frames (also called simply "frames" herein). The captured frames may be buffered by the I/O interface(s) 204 and provided to the processing device(s) 202 to be processed in real-time or near real-time (e.g., within 100 ms).

The head-controlled device 100 may include one or more optional network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The head-controlled device 100 includes one or more memories 208, which may include a volatile or non-volatile memory (e.g., a flash memory, a random access memory (RAM), and/or a read-only memory (ROM)). The non-transitory memory(ies) 208 (collectively referred to as the memory 208) may store instructions 230 for execution by the processor(s) 202, such as to carry out examples described in the present disclosure. For example, the instructions 230 contain at least instructions for implementing a computer vision system, which may be used by the head-controlled device 100 to process frames captured by the camera 102 to track users' heads and bodies according to known computer vision techniques, and to perform other operations described herein. The memory 208 may include other software instructions, such as for implementing an operating system and other applications/functions.

The memory 208 may store various types of information used or generated by the methods and operations described herein. Range of Motion (ROM) information 217 may include empirical data showing one or more ranges of motion for the human head, as described below. The ROM information 217 may include population-level average ROM information and/or individual users' ROM information. Error information 218 may include empirical data based on HCI research showing error rates or accuracy of directed head movements at various head orientations, such as various degrees of pitch and/or yaw from a neutral position. GUI design information 212, which may include GUI layout information 214 and time sensitivity information 216, may be generated by a software designer during a design step of the methods described herein and stored for use by the head-controlled device 100 in interactions with the user. Context information 220, obtained during an initialization step of the methods described herein, may include body position information 222 indicating a position of the user's body (including location and angular orientation) and environment information 224 indicating details about the user's environment (e.g. driving a car, in a boardroom). The error information 218, GUI design information 212, and context information 220 may be used to generate an input-output (I/O) map 210 mapping an input space defined by rotation of a user's head to an output space used to control the operation of the head-controlled device 100. In some embodiments, each of these types of information 210 through 224 may be stored in the memory 208 after being obtained, generated, and/or updated.

In some examples, the head-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the head-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the head-controlled device 100 may communicate with each other via a bus, for example.

In some embodiments, a distributed system may include multiple devices, including one or more head-controlled devices 100, as well as optionally one or more additional components. In some embodiments, the distributed system is an augmented reality (AR) or virtual reality (VR) system that includes a single head-controlled device 100, one or more digital cameras (e.g. a digital camera array positioned around a physical space) and one or more displays (e.g., two displays in a stereoscopic head-mounted display unit). In this embodiment, the single head-controlled device 100 is used to recognize hand gestures in frames captured by the digital camera 102 of the head-controlled device 100 and/or the multiple digital cameras of the system, and the head-controlled device uses the user's head movements to control the displays to render information thereon. In some embodiments, one or more cameras 102 may be configured to communicate with a head-controlled device 100 (e.g., via a network interface 106 or I/O interface 204), which in turn communicates (e.g., via a network interface 106 or I/O interface 204) with one or more large displays 104 (such as television monitors) positioned in the user's environment. It will be appreciated that these systems are provided as examples, and that other distributed systems are possible. It will also be appreciated that different embodiments may include different combinations of input and output devices in place of, or in addition to, the digital camera 102 and display 104.

Head Rotations

Figure 3:
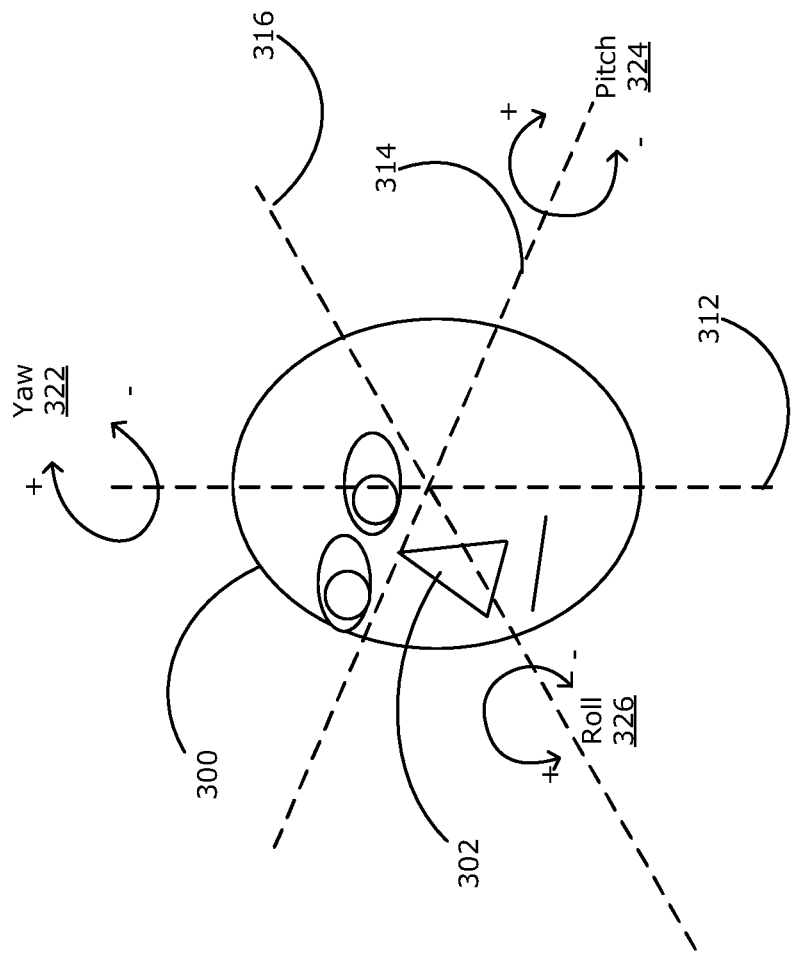
FIG. 3 is a front left elevated view of a simplified human head, showing three axes defining the yaw, pitch, and roll angles of the head.

FIG. 3 provides an illustration of head orientation and rotation. In the present disclosure, a head orientation indicates an angular position of a head 300 with respect to three rotations: a yaw rotation 322 (i.e. rotation about a vertical yaw axis 312 defined by the user's standing body), a pitch 324 rotation (i.e. rotation about a horizontal pitch axis 314 passing from the left side of the user's body to the right side of the user's body), and a roll rotation 326 (i.e. rotation about a horizontal roll axis 316 passing from the front of the user's body to the back of the user's body). In embodiments described herein, the three axes 312, 314, 316 are defined with respect to the location and orientation of the user's body, such that a user with his or her head 300 in a neutral position (i.e. head 300 facing forward and not rolled to either side) may be considered to have a head with yaw 312, pitch 314, and roll 316 values of zero degrees. Each direction of head rotation away from the neutral position may be considered a positive or negative value: yaw 312 may be indicated by a positive angle for rotation to the right and negative for rotation to the left; pitch 314 may be indicated by a positive angle for rotation upward and negative for rotation downward; and roll 316 may be indicated by a positive angle for rotation to the right and negative for rotation to the left.

Embodiments described herein may track a user's head 300 using various computer vision techniques known in the field. In some embodiments, the camera 102 is used to capture video frames showing the user's head 300, and the position of the user's nose 302 or other facial feature may be tracked relative to other features to determine the orientation of the head 300 in a given frame. Whereas some embodiments described herein use only yaw 312 and pitch 314 to provide head-based input to the head-controlled device 100, some embodiments also make use of roll 316 to provide additional user input. For example, some embodiments may map yaw 312 to horizontal movement and pitch 314 to vertical movement of a cursor or focus indicator within an output space (such as a 2D display), wherein horizontal and vertical coordinates of the output space are defined relative to the orientation of the output space, such as the orientation of a 2D display device. Some embodiments may map roll 316 to radial or arc-shaped movement of the cursor or focus indicator within the output space.

Head Range of Motion

Embodiments described herein may refer to a range of motion of a user's head. The motion of a user's head may be constrained by multiple different factors, resulting a range of motion (ROM) that is context-dependent, i.e. the ROM is dependent on the contextual factors that are present. Empirical data may be collected about a user population, or about a specific user, indicating one or more ROMs defined by various different constraints. A comfortable ROM indicates the range of head motions that a user can make without feeling physical discomfort. A physical ROM indicates a range of head motions a user is physically able to make. A social ROM indicates the range of head motions a user can make in the user's current social setting, such as when alone or when in a meeting.

Individual users' ROMs may be assessed during an initialization and/or a calibration step. Each individual user has unique characteristics that define his or her physical ROM: for example, a person with certain disabilities may have a different physical ROM compared to an able-bodied person. Similarly, a different social ROM may apply to each of a plurality of social contexts (e.g., alone, playing a VR game, in a meeting, driving).

Table 1 below shows empirical data collected for users' ROMs when facing the front of the center of a display, approximately 1 meter away from the display. ROM information 217 may include data defining one or more ROMs (e.g., comfortable, physical, and/or social), for a population and/or individual users.

TABLE 1

Mean values of users' head Range of Motion (ROM), in degrees.

| ROM | Rotation | Direction | Angle | 95% CI |
| --- | --- | --- | --- | --- |
| Comfortable ROM | Yaw | Left | 35.86 | 3.05 |
| | | Right | 39.58 | 2.99 |
| | Pitch | Top | 25.57 | 2.23 |
| | | Bottom | 19.42 | 2.69 |
| Physical ROM | Yaw | Left | 41.42 | 2.78 |
| | | Right | 49.84 | 1.51 |
| | Pitch | Top | 34.33 | 2.53 |
| | | Bottom | 26.85 | 2.88 |
| Social ROM (in a social setting) | Yaw | Left | 29.5 | 2.97 |
| | | Right | 32.09 | 2.46 |
| | Pitch | Top | 19.88 | 2.3 |
| | | Bottom | 15.36 | 2.4 |

Input-Output Map

Embodiments described herein may generate an input-output map 210 for a head-controlled device based on GUI design information 212, context information 220, ROM information 217, and error information 218. The I/O map 210 may be applied during a HCI session to map user head movements to an output space of a GUI, thereby enabling head-based control of the head-controlled device 100.

Figure 4B:
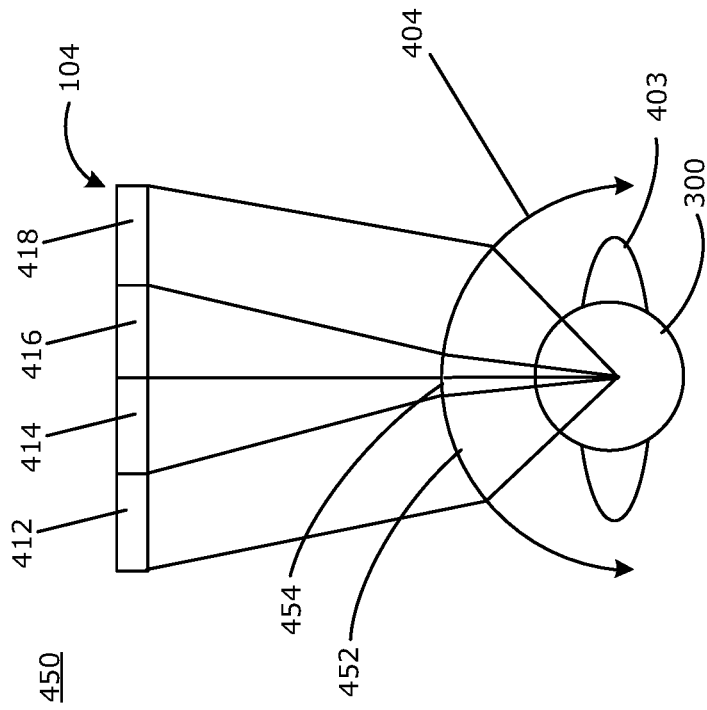
FIG. 4B is a top view of a user's head and body, showing an adaptive mapping of a yaw angle value of an input space to a horizontal coordinate value of an output space, according to examples described herein.
Figure 4A:
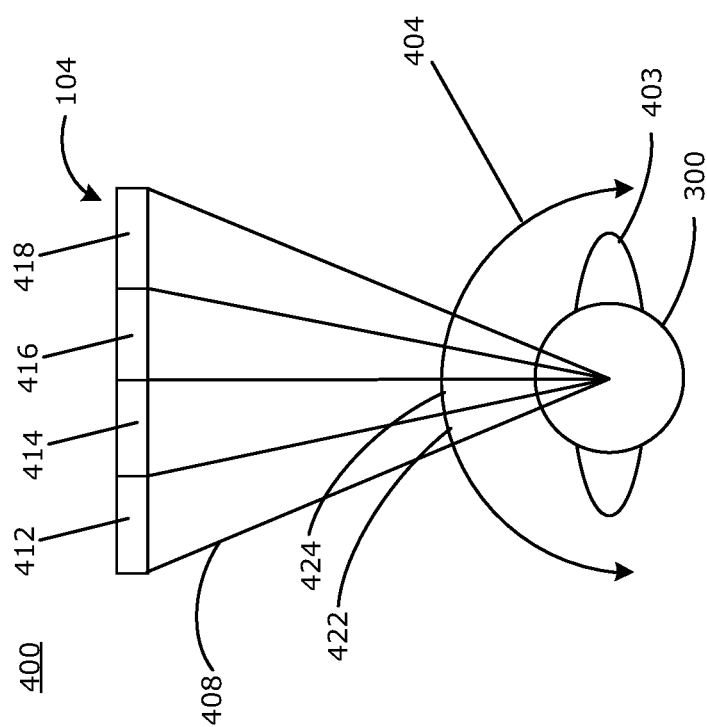
FIG. 4A (prior art) is a top view of a user's head and body, showing a ray-tracing system for mapping a yaw angle value of an input space to a horizontal coordinate value of an output space.

FIG. 4A (prior art) shows a conventional ray-casting approach to head-based HCI. Ray-casting is an object pointing HCI method that is similar to pointing to objects on a whiteboard with a laser pointer. Ray-casting is commonly used in AR and VR. Existing approaches to head-based HCI use head position and orientation to perform ray-casting for object selection. In head-based ray-casting, the angle of head movement is directly mapped to the output space (e.g., the 2D display pixel coordinates or virtual space) using a straight line projected from the front of the user's head.

Thus, in the example shown in FIG. 4A, when the front of a user's head 300 is pointed within a first range 422 of yaw rotation 404, a straight ray 408 projected from the front of the user's face intersects with a display 104 at a first range 412 of a horizontal coordinate of the output space defined by the display 104. A head-based ray-casting approach therefore maps the head rotation within the first yaw range 422 to the first output range 412. Similarly, ray cast from the front of the user's head when pointed within a second range 424 of yaw rotation 404 would be mapped to the second output range 414, and so on.

Head-based ray-casting is similar to head-based gaze tracking, another HCI technique: both ray-casting and gaze tracking assume that the head's orientation indicates the direction of the user's gaze. However, head-based ray-casting or gaze tracking present limitations. Precise pointing is difficult using these techniques, as it requires subtle movement using the neck. In addition, as described above, HCI research has found that head movement become less precise, less controllable, and slower the farther the head is a from neutral position. This means that GUI element section using head movements farther from the neutral head portion will be more difficult for a user assuming a uniform distribution of GUI elements across the horizontal coordinate of the output space (such as the horizontal pixel coordinate of a 2D display device defined relative to the orientation of the display device). This problem is even more acute in contexts in which the user's body 403 is not angled directly facing the display 104, as the far side of the display from the user's neutral head position becomes even more difficult to accurately direct head movements toward.

Yet the ray-casting approach not only does not compensate for this non-uniformity of head movement precision across a user's ROM, it may actually exacerbate this problem. Assuming that a user is facing toward the display 104 and aligned with the center of the display 104, the distance from the display center of the ray's intersection with the display 104 actually accelerates as the user's head yaw angle increases from the neutral position. Thus, if the user's head 300 is one meter away from the center of the display 104, then a 45 degree yaw angle displaces the ray's 408 intersection with the display 104 one meter from the center; however, doubling the yaw angle of the user's head 300 to 90 degrees results in an infinite displacement of the ray's 408 intersection with the display 104. Thus, ray-casting makes GUI targets distal from the display center much more difficult to accurately select using head movements, relative to GUI targets closer to the center of the display.

Accordingly, the I/O map 210 may make use of the error information 218 and the ROM information 217 to map sub-ranges of the user's head ROM to regions of the output space such that the reduced speed and accuracy of head movement at extreme head rotations (i.e. far from the neutral position) is mitigated by increasing the effective target size for GUI element targets in those regions. The I/O map 210 may also take the location and orientation of the user's body 403 relative to the display 104 into account, as this affects the user's ROM and estimated error rates when looking at different regions of the display 104.

FIG. 4B shows an example adaptive I/O map 210 applied to a user's head orientation when facing a display 104, as in FIG. 4A. The I/O map 210 applied in FIG. 4B results in a mapping of the yaw rotation 404 (i.e. a first head rotation) of the user's head 300 to the output space of the display 104 such that regions of the display 104 farther from the center of the display (corresponding, in this example, to the neutral position of the user's head 300), such as sub-ranges 412 and 418 of the horizontal coordinate of the output space, are allocated larger target sizes relative to regions of the display 104 closer to the center of the display 104, such as sub-ranges 414 and 416 of the horizontal coordinate of the output space. For example, sub-range 412 of the horizontal coordinate of the output space corresponds to relatively large sub-range 452 of the yaw rotation 404 of the user's head 300, whereas sub-range 414 of the horizontal coordinate of the output space corresponds to relatively small sub-range 454 of the yaw rotation 404 of the user's head 300. Because sub-range 414 is close to the head's neutral position, the user can easily and quickly orient his or her head within the small sub-range 414; however, because sub-range 412 is farther from the head's neutral position, the sub-range 412 is made relatively large to enable the user to more easily and quickly orient his or her head within that sub-range 412. Thus, the I/O map 210 used in FIG. 4B effects a continuous uneven angle allocation of a head rotation (e.g., yaw) to values of a coordinate of the output space (e.g., the horizontal coordinate), such that the head orientation angle sub-ranges allocated to each output space coordinate sub-range are increased or decreased relative to the angle allocations resulting from the ray-casting approach of FIG. 4A.

Although FIGS. 4A and 4B show a mapping of a yaw rotation 404 to a horizontal coordinate of an output space, it will be appreciated that the same principle applies to mappings of a pitch or roll angle to a coordinate of an output space, and to mappings of a head rotation angle to a non-horizontal coordinate of an output space. For example, embodiments described herein may use I/O mappings of a yaw angle to a horizontal coordinate of an output space, I/O mappings of a pitch angle to a vertical coordinate of an output space, and/or I/O mappings of a roll angle to a polar coordinate of an output space, but the present disclosure is not limited to these mapping and could encompass other mappings, such as a mapping of a yaw angle to a vertical coordinate.

Figure 4C:
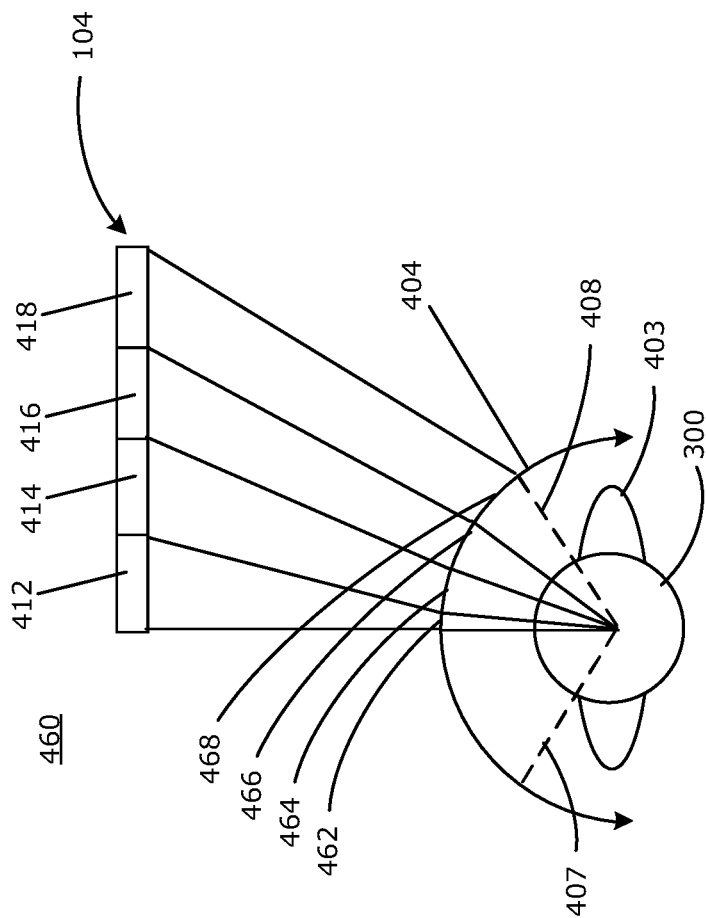
FIG. 4C is a top view of a user's head and body, showing an adaptive mapping of a yaw angle value of an input space to a horizontal coordinate value of an output space when the user's body is not facing toward the center of the output space, according to examples described herein.

FIG. 4C shows a further example in which an I/O mapping 210 is used to map the user's head's 300 yaw rotation 404 to a horizontal coordinate of an output space defined by the display 104. In this example, the user's body 403 is oriented with its shoulders parallel to the display 104 as in FIGS. 4A-4B, but the body is not centered on the display 104. Instead, the center of the user's body 403 is displaced horizontally to the left from the center of the display 104. Example embodiments described herein may use body and head tracking techniques to recognize the location and orientation of the user's body 403 in order to properly generate an I/O map that takes the user's head ROM and estimated error rates into account.

In this example, the ROM of the user's head 300, as indicated by one or more ROMs (or combinations thereof) of the ROM information 217, extends from left yaw limit 407 to right yaw limit 408. Because the display 104 is located with the user's right-side field of vision based on the position and orientation of the user's body 403, this means that the user may need to turn his or her head 300 to the right in order to view the display 104. Accordingly, an I/O map may be generated whereby the yaw angle values from 0 degrees (i.e. the yaw value of the neutral position) to the right yaw limit 408 define a range of useful input values for the yaw rotation 404. Accordingly, this range of useful input values is mapped to the output space by the I/O map such that sub-ranges of this useful range farther from the neutral position (e.g., sub-ranges 468 and 466) are larger than sub-ranges of the useful range closer to the neutral position (e.g., sub-ranges 462 and 464), with each sub-range 462, 464, 466, 468 corresponding to a sub-range of the output space 412, 414, 416, 418 having equal span in the horizontal coordinate dimension.

Figure 5:
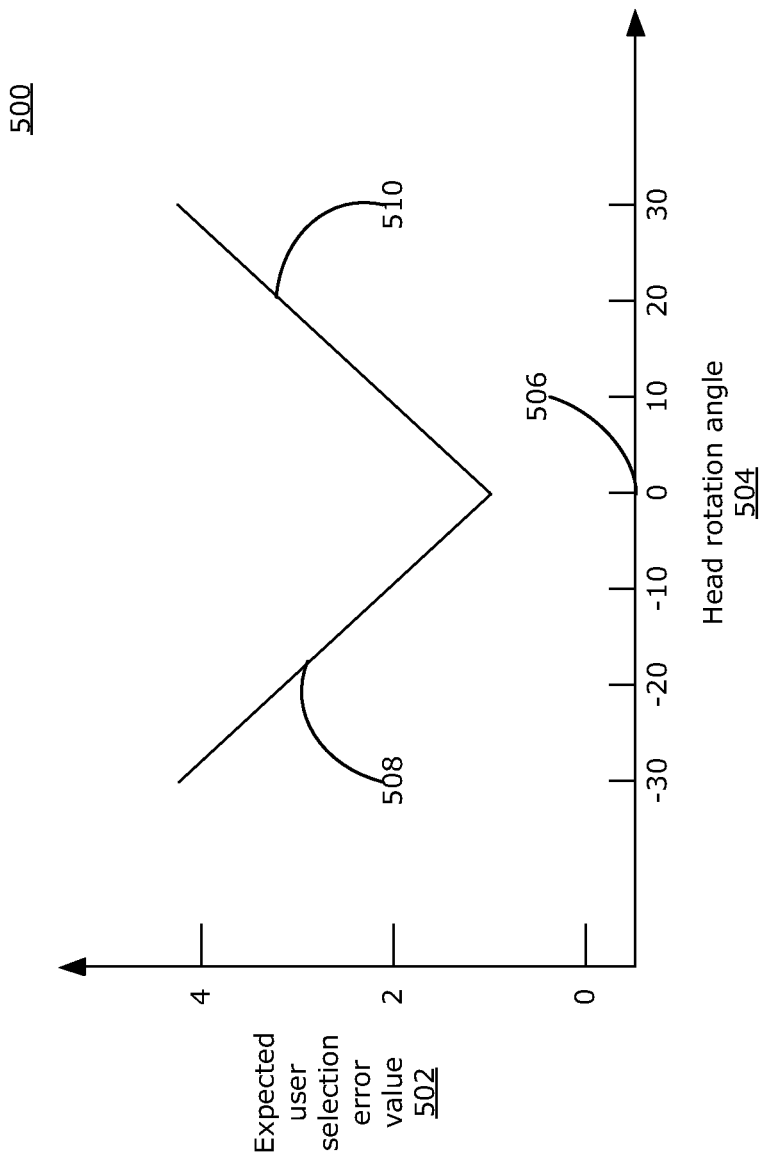
FIG. 5 shows a graph of expected selection error value against a head rotation angle, showing an environment in which examples embodiments described herein may operate.

FIG. 5 shows a graph 500 of expected selection error value 502 against a head rotation angle 504. The head rotation angle 504 may be an angular value, in degrees, of any head rotation (yaw, pitch, or roll), with the zero value 506 corresponding to the neutral position of the head. The data shown in the graph 500 is an approximation of empirical data collected by HCI research on the accuracy of users' head movements in performing a timed head-based target-seeking task. Users were given two seconds to point their heads toward a target on a display while receiving visual feedback in the form of a cursor indicating the currently selected point on the display. The number of degrees by which users missed the target is indicated as the expected selection error value 502 on the vertical axis.

It can be observed that the negative-value curve 508 and positive-value curve 510 both exhibit an approximately linear relationship between expected selection error value 502 and head rotation angle 504: as the head rotation value 504 moves away from the neutral position, in either the positive direction or the negative direction, the expected selection error value 502 increases in proportion to the angular displacement of the head from the neutral position. Therefore, if the expected selection error value 502 is expected to be one degree at the neutral position 506 and two degrees at an angular displacement of ten degrees of head rotation angle 504 (e.g., a head yaw of ten degrees to the left or to the right from the neutral position), then the expected selection error value 502 may be expected to be three degrees at an angular displacement of twenty degrees of head rotation angle 504, and so on throughout the user's range of motion. It will be appreciated that this relationship may differ in some of its particulars over some sub-ranges of the head's range of motion, and may differ from one user to another. However, in most cases, the expected selection error value for each input range will be positively correlated with an angular distance of the input range from a neutral orientation of the head. The linear relationship described above may be used as an example relationship between expected selection error value 502 and head rotation angle 504 for the purpose of generating a non-user-specific I/O map for angular head movements as described herein.

It will further be appreciated that an expected selection error value 502 may be computed for a sub-range of the head rotation angle 504 based on an average value, such as using a center value of the head rotation angle 504 sub-range. Thus, for example, the head rotation angle 504 sub-range from −15 degrees to −5 degrees may be considered to have an expected selection error value 502 as shown at the midpoint of the sub-range, i.e. at −10 degrees. In some examples, the expected selection error value 502 is computed for a sub-range of the head rotation angle 504 by averaging (e.g., calculating a mean or a weighted average) the expected selection error value 502 at the left end of the sub-range with the expected selection error value 502 at the right edge of the sub-range. In some examples, the empirical data may indicate expected selection error value 502 for sub-ranges, such as 5 degree sub-ranges of the head rotation angle 504, and the curves 508, 510 shown in FIG. 5 may indicate an extrapolation, interpolation, or regression between those sub-range data points.

The relationship between expected selection error value 502 and head rotation angle 504 described above, or variants thereof based on empirical data obtained about a specific user or a population of users, may be used to generate an I/O map 210 for angular head movements with respect to a head rotation that allocates input space target sizes for GUI elements that are scaled in accordance with the expected selection error value 502 of the sub-range of head rotation angle 504 where the GUI element is located.

In a first example embodiment, the I/O map is generated with respect to a GUI by defining a center location and a span for each GUI element in the GUI, based on the expected selection error value 502 of the sub-range of the input space occupied by the GUI element. Thus, for example, the GUI designer may manually generate the GUI layout information 214 by defining, with respect to each coordinate of the output space, a center location and a span for each GUI element in the GUI. For example, a GUI intended to be navigated according to a horizontal coordinate and a vertical coordinate (such as the grid GUI 630 shown in FIG. 6C and described below) may associate with each GUI element of the GUI a horizontal center location and a horizontal span (i.e. a width), as well as a vertical center location and a vertical span (i.e., a height). The center location and span of a GUI element defines an output range with respect to the output space coordinate: for example, a GUI element with a center Y pixel value of 225 and a vertical span of 20 pixels spans the output range of Y=215 to Y=235. I/O map(s) 210 may then be generated by the head-controlled device 100, as described herein, for each output space coordinate, wherein the span of the input space sub-range (i.e. the sub-range of head rotation angle 504) is based on the expected selection error value 502 for the output range corresponding to the GUI element. Thus, if the output range Y=215 to Y=235 falls within the input space sub-range of 5 degrees positive pitch to 15 degrees positive pitch (i.e. the user's head is pitched upward between 5 and 15 degrees), then the expected selection error value 502 is approximately 2 degrees (using the example graph 500), which is approximately twice the expected selection error value 502 of the neutral position: this means that the I/O map 210 may scale the input space span (i.e. sub-range of head pitch) of the GUI element to be twice the input space span of a 20-pixel-tall GUI element appearing in the output range corresponding to the neutral position of the head. In some examples, each GUI element of the GUI may be scaled or normalized in span such that they are non-overlapping with respect to each output space coordinate.

In a second example, the GUI elements of a GUI are defined by a sequential order with respect to a coordinate of the output space. For example, a column of menu items in a vertical menu (as in the vertical GUI 620 shown in FIG. 6B) are ordered sequentially with respect to a vertical coordinate of the output space, and a row of menu items in a horizontal menu (as in the horizontal GUI 600 shown in FIG. 6A) are ordered sequentially with respect to a horizontal coordinate of the output space. The head-controlled device 100 may automatically generate the I/O map(s) 210 based on the sequential order of the GUI elements (indicated by the GUI layout information 214 of the GUI information 212) and the expected selection error values 502 indicated by the error information 218. First, the output space is segmented into a plurality of output ranges, each output range corresponding to a GUI element of the plurality of GUI elements of the GUI. Next, the span of each input range of the first input-output map is determined based on the relationship between the expected selection error values 502 and the corresponding value of the head rotation angle 504. Thus, each GUI element in the sequential order may be allocated an equal output space span with respect to the output space coordinate, and the I/O map 210 may be generated such that the input space span of a head rotation angle 504 sub-range corresponding to each output space range is directly proportional to the expected selection error values 502 of that respective head rotation angle 504 sub-range.

In some embodiments, the GUI designer may manually define the I/O map(s) 210 for the GUI using empirical data regarding the relationship between expected selection error value 502 and head rotation angle 504, either in full or in part. For example, in some embodiments a GUI designer may manually define a center location for each GUI element in the GUI and allow the head-controlled device 100 to automatically generate the I/O map, including the span of each GUI element, as described herein. In some embodiments, the GUI designer may manually specify both a center location and a relative span value for each GUI element in the GUI; the head-controlled device 100 may then scale each GUI element based on the expected selection error value 502 from its respective manually determined relative span.

It will be appreciated that only a portion of the input space may be mapped to the output space in some embodiments. For example, in some embodiments a user's head is not considered to be interacting with the output space of a display if the user's head is pointed (according to a conventional ray-casting measurement as in FIG. 4A) more than a predetermined number of degrees outside of the visual field occupied by the display. Similarly, the user's range of motion (as defined by the range of motion information 217 combined with the body position information 222, environmental information 224, and/or other context information 220) may define an outer limit on the portion of the input space that can be usefully mapped to the output space. Thus, for example, in the example shown in FIG. 4C, the right limit 408 on the user's range of motion sets an outer limit for the usable portion of the input space (in this example, yaw). The example I/O map 210 shown in FIG. 4C uses the ray-casting line from the user's head to the left edge of the display 104 as the left-most limit on the yaw input space; however, as described above, in some examples the GUI information 212 may define a predetermined head rotation angle outside of the edge of the display 104 that may still be used as part of the input space. It will be appreciated that in some embodiments a GUI designer may manually define the GUI information 212 to include different portions of the user's head rotation angle, in each rotational dimension, as the usable input space, and that these portions may be defined with respect to the range of motion information 217 and/or context information 220.

Various GUI layouts will now be described that may be mapped to head orientation input spaces by I/O maps 210 described herein.

Example GUI Layouts

FIG. 6A is a horizontal graphical user interface (GUI) 600 showing five GUI elements (GUI 1 602, GUI 2 604, GUI 3 606, GUI 4 608, and GUI 5 610) arranged in a horizontal layout, such that each GUI element occupies a sub-range of the horizontal coordinate 601 of the output space. The GUI elements all have the same span; however, I/O mappings described herein may allocate different sub-ranges of an input space, such as sub-ranges of a yaw orientation of the user's head, to each GUI element based on the location and position of the user's body relative to the location where the horizontal GUI 600 is displayed (i.e. the body position information 222), the error information 218, and the ROM information 217.

The layout of the horizontal GUI 600 may be encoded as GUI layout information 214 as part of the GUI design information 212 when the GUI is designed, for example by a human GUI designer. The GUI designer may also include time sensitivity information 216 in the GUI design information 212 when designing the GUI to indicate a time sensitivity of the intended software application governed by the horizontal GUI 600: for example, if the horizontal GUI 600 is intended to be used to interact with a surgical software program used by a surgeon in an operating room environment, the time sensitivity information 216 may indicate high time sensitivity, as there may be severe consequences to an incorrect GUI element selection by the user that may require the user to reverse the selection, return to an earlier GUI menu, etc. If the time sensitivity information 216 indicates high time sensitivity, then the horizontal GUI 600 may be designed to require a longer period between detecting selection of the selected GUI element and executing a function associated with the selected GUI element. For example, a horizontal GUI 600 may be defined (by the GUI information 212) such that selecting one of the GUI elements 602 through 610 using head orientation results in a new GUI being displayed representing a nested menu of the selected GUI element. In the context of a high-time-sensitivity surgical software application, GUI 3 606 may be associated with a "switch camera" function executable to present a second GUI to the user enabling the selection of a specific camera of an array of endoscopic cameras. In this example, selection of GUI 3 606 is effected by a dwell input, i.e. detection of the user's head in an orientation mapped to the selected GUI element for a predetermined time period or number of frames captured by the camera 102. Due to the time sensitivity of the surgical software application, the predetermined dwell time may be increased to minimize the risk of an incorrect selection of a GUI element, which would launch the GUI for the nested menu and require the user to back out of the nested menu to return to the initial horizontal GUI 600.

After the GUI designer has designed the GUI by specifying the GUI layout information 214 and the time sensitivity information 216, the GUI design information 212 may be stored in the memory 208 of the head-controlled device 100. The GUI design information 212 is used to generate the I/O map(s) used for head-based HCI by the head-controlled device 100, as described below with reference to the example methods shown in FIGS. 7-9.

FIGS. 6B-6D illustrate additional GUI layouts that may be encoded as GUI layout information 214 by a GUI designer, as described above.

FIG. 6B is a vertical GUI 620 showing five GUI elements arranged in a vertical layout, such that each GUI element occupies a sub-range of the vertical coordinate 603 of the output space. The GUI elements all have the same height; however, I/O mappings described herein may allocate different sub-ranges of an input space, such as sub-ranges of a pitch orientation of the user's head, to each GUI element based on the location and position of the user's body relative to the location where the vertical GUI 620 is displayed (i.e. the body position information 222), the error information 218, and the ROM information 217.

FIG. 6C is a grid GUI 630 showing GUI elements arranged in a grid layout. The grid GUI 630 may be navigated using two head orientations: for example, a first I/O map may map the yaw angle of the user's head to the horizontal coordinate 601 of the output space, whereas a second I/O map may map the pitch angle of the user's head to the vertical coordinate 603 of the output space. Thus, a user may change user interface (UI) focus from GUI element GUI 1 602 in the upper-left corner of the grid to GUI element GUI 5 610 below GUI 1 602 by pitching his or her head downward. Similarly, the user may change UI focus from GUI element GUI 1 602 in the upper-left corner of the grid to GUI element GUI 2 604 to the right of GUI 1 602 by yawing his or her head to the right.

FIG. 6D is a radial GUI 640 showing GUI elements arranged in a radial layout. In some examples, the GUI designer may define the GUI layout information 214 such that yaw and pitch orientations of the head 300 are mapped to the horizontal coordinate 601 and vertical coordinate, respectively. The yaw and pitch of the user's head 300 may thus be mapped to the wedge-shaped regions of the radial GUI 640 corresponding to the GUI elements 602, 604, 606, 608, 610, 612. The yaw and tile I/O maps effecting this mapping may effectively enlarge the yaw and pitch sub-ranges farther from the neutral position to effect this mapping relative to a ray-casting approach; for example, when the user's head is pitched downward toward the bottom edge of the radial GUI 640, the yaw sub-range allocated to GUI 5 610 may be relatively narrow, whereas the yaw sub-ranges allocated to GUI 6 612 and GUI 4 608 may be relatively wide.

In other examples, the GUI designer may define the GUI layout information 214 such that the roll orientation of the head 300 is mapped to a direction coordinate 607 of a set of polar coordinates (consisting of a distance coordinate 605 and a direction coordinate 607). For example, a neutral position of the user's head 300 may be mapped to GUI 2 604, roll orientations to the left may be mapped to GUI 1 602, GUI 6 612, and GUI 5 610 in that order moving left from the neutral position, and roll orientations to the right may be mapped to GUI 3 606, GUI 4 608, and GUI 5 610 in that order moving right from the neutral position.

Thus, the GUI layout information may include not only the visual layout of GUI elements, but also the coordinate system used by the output space defined by the GUI, and potentially also the correspondence between each head orientation (yaw, pitch, and roll) and each coordinate of the output space. The specific values of a head orientation that correspond to a specific value of an output space coordinate may then be defined automatically and adaptively by the instructions 230 executed by the head-controlled device 100 to generate the I/O map(s) used during head-based HCI, based at least in part on the GUI layout information 214. Generation of the I/O maps may take into account aspects of the GUI layout information 214 such as the size and number of the GUI elements defined by the GUI layout information 214, in addition to the relative positions of the GUI elements in the GUI layout. Examples of I/O map generation are described below with reference to the examples methods of FIGS. 6-8.

Example Methods for Head-Based HCI

Figure 7:
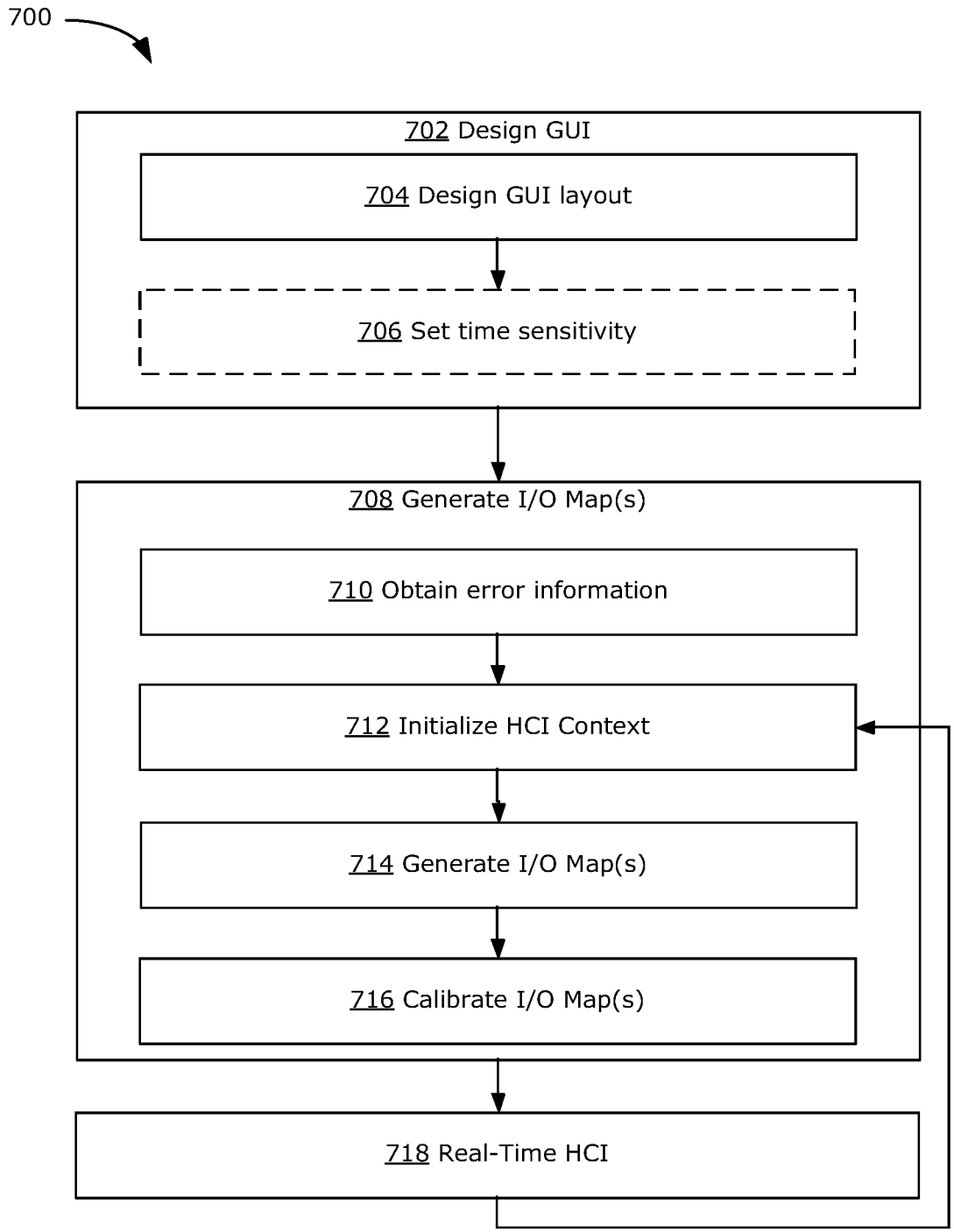
FIG. 7 is a flowchart illustrating steps of an example method for controlling a head-controlled device based on an orientation of a user's head, according to examples described herein.

FIG. 7 is a flowchart illustrating an example method 700 for controlling a head-controlled device 100 based on an orientation of a user's head. The method 700 proceeds in three general stages: a GUI design stage 702, an I/O map generation stage 708, and a real-time HCI stage 718.

At the GUI design stage 702, a GUI designer designs a GUI, as described above. The design of the GUI may be encoded and stored as GUI design information 212.

The GUI design stage 702 includes step 704, in which the GUI designer defines the GUI layout (such as a horizontal GUI 600 or a vertical GUI 620). The GUI layout may be encoded and stored as GUI layout information 214. As described above, the GUI layout information 214 may encode not only the visual layout of the GUI elements, but also a correspondence between head orientations defining the input space (i.e. yaw, pitch and roll) and coordinates of the output space defined by the GUI (e.g., horizontal or vertical coordinates of a Cartesian coordinate system, or directional or distance coordinates of a polar coordinate system).

At 706, optionally, the GUI designer defines the time sensitivity of the software application associated with the GUI, as described above. The time sensitivity may be encoded and stored as time sensitivity information 216.

At the I/O map generation stage 708, one or more I/O maps 210 are generated based on the error information, GUI designed at the GUI design stage 702, and context information gathered during an initialization step 712. Optionally, the generated I/O map(s) may be further calibrated during a calibration step 716.

At 710, the error information 218 is obtained, indicating the expected selection error value 502 for each sub-range of each head rotation angle 504 of the input space. As described above, the error data 218 may be stored in the memory 208 based on empirical HCI data. In some examples, the calibration step 716 described below may generate further error information 218, such as error data specific to a specific user, which may be stored in the memory 208 to either supplement, modify, or replace the existing error information 218. For example, a separate user profile may be generated and stored for each user of the head-controlled device 100 based on calibration performed on each user.

At 712, an initialization step is performed at the beginning of a head-based HCI session (i.e. a session during which a user will interact with the head-controlled device 100) to determine the HCI context. The camera 102 of the head-controlled device 100 may obtain frames, which can be analyzed by the computer vision system of the head-controlled device 100 to determine context information 220. The identity of one or more users within the frame may be determined, for example by using face recognition techniques. If more than one user in visible in the frame, an active user may be identified based on rules governing the HCI session, such as instructions 230 stored in the memory 208. Alternatively, the identity of a current user may be determined based on information stored in the memory 208, such as user credential information used to initiate the HCI session. The frames obtained by the camera 102 may be used by the computer vision system to recognize the location and orientation of the active user's body 403, which may be stored as body position information 222. The user's environment and/or the social context of the HCI session, as described above, may also be determined by scene analysis techniques implemented by the computer vision system, and stored as environment information 224.

The range of motion information 217 may also be obtained during the initialization step 712. In some examples, the range of motion information 217 may be user-specific ROM data previously obtained during HCI sessions with the current active user. In some embodiments, user-independent ROM data may be used.

In some examples, the initialization step 712 may include a process by which the head-controlled device 100 recognizes that the active user has performed a gesture or provided another user input triggering a head-based HCI session. For example, the computer vision system may scan a sequence of frames for a pre-defined head or hand gesture (such as nodding of the head by pitching it in two different direction in sequence) by the active user. In response to recognizing this triggering user input, the head-controlled device 100 may enter a head control mode of operation, in which head movements are closely tracked and used to determine UI focus, as described herein. By initiating the head-based HCI session only in response to a specific triggering user input, the head-controlled device 100 may avoid responding to a user's head movements when it is not the user's intention to interact through a head-based input modality.

At 714, the I/O map(s) necessary for interaction with the GUI defined at the GUI design stage 702 are generated. As described above, the ROM information 217 and body position information 222 may be processed to determine a usable portion of the input space for each hear rotation. The body position information 222 and error information 218 may then be processed, along with the GUI information 212, to generate one or more I/O maps 210 necessary to map one or more user head rotations to one or more output space coordinates. As described above with reference to FIGS. 4B, 4C, and 5, the GUI elements of the GUI (defined by the GUI information 212) may be allocated sub-ranges of the input space for each head orientation that have input space spans scaled based on the estimated selection error value 502 for the head orientation sub-range, e.g., head orientation sub-ranges farther from the neutral position have spans scaled up relative to head orientation sub-ranges closer to the neutral position. The generated I/O map(s) 210 may be stored in the memory 208.

At 716, optionally, a calibration step may be performed to validate or adjust the I/O map(s) 210 generated at step 714. The calibration step 716 may prompt the active user to perform one or more head-pointing exercises to assess relevant information about the user's head movements. The head-controlled device 100 then receives a plurality of calibration frames captured by the camera 102 while the active user is performing the head-pointing exercises, and processes the plurality of calibration frames to calibrate the I/O map(s) 210 to the user: for example, the error information 218 and/or the range of motion information 217 may be adjusted based on the results of processing the plurality of calibration frames, thereby modifying the I/O map(s) 210 based on the adjusted error information 218 and/or adjusted range of motion information 217. For example, the user may be prompted to turn his or her head 300 as wide as possible, in a way that is physically comfortable, while ensuring the display 104 remains in the user's field of view by reading a predefined content (such as a random number or text) shown in the center of the display 104. This task is repeated for all three head rotations (yaw, pitch, and roll) to determine user's range of motion (ROM), which may be stored as user-specific ROM information 217. In some embodiments, the user may be prompted to perform a timed head-pointing task, and the angle of error may be recoded as additional error information 218, which may modify or replace the existing user-independent error information for the current active user.

Thus, at the end of the I/O map generation stage 708, at least one input-output map 210 has been obtained. The I/O map 210 indicates, for each input range of a plurality of input ranges, a corresponding output range. Each input range comprises a range of values of a first head rotation, such as sub-ranges of head yaw within the user's yaw ROM. Each output range comprises a range of values of a first coordinate of an output space, such as a horizontal coordinate of the output space of a horizontal GUI 600. Each input range has a span based on an expected selection error value 502 for the input range, such as a higher expected selection error value 502 for yaw angle ranges located farther from the neutral position (yaw=0 degrees). The plurality of output ranges correspond to plurality of GUI elements 602 through 610 displayed on a display screen (i.e. a UI screen on the display 104) of the head-controlled device 100, such that the selected GUI element corresponds to the selected output range of the I/O map 210.

Figure 8:
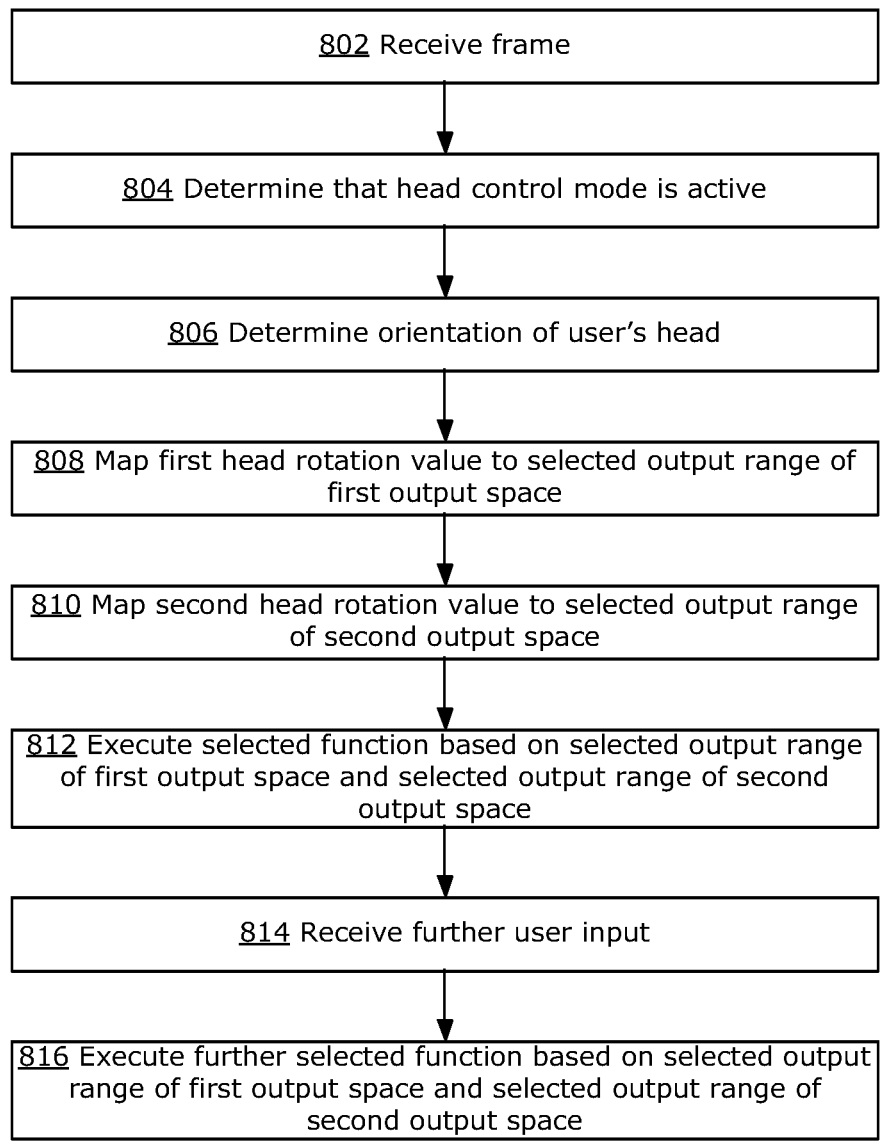
FIG. 8 is a flowchart illustrating sub-steps of an example real-time human-computer interaction (HCI) step of the method of FIG. 7.

At 718, after the I/O map(s) have been generated at stage 708, the head-based HCI session is performed in real time. FIG. 8 shows steps of an example real-time HCI stage 718. The steps of stage 718 may be repeated continuously during an HCI session.

At 802, the head-controlled device 100 receives a frame captured by the camera 102.

At 804, optionally, the head-controlled device 100 may determine that the head control mode is active. This determination may be made by checking a system variable or other information set during the initialization step 712 of the I/O map generation stage 708 as described above. If head control mode is active, the method 700 proceeds with the head-based HCI session (i.e. steps 806 through 816); if head control mode is not active, then the method 700 may return to an earlier step or stage, such as I/O map generation stage 708, and the frame obtained from the camera 102 may be used only for other purposes, such as recognizing a head or hand gesture indicating user input triggering head control mode. In some embodiments, the recognition of user input triggering the beginning of a head-based HCI session (i.e. entering head control mode) may be performed during the real-time HCI stage 718 instead of during the initialization step 712.

At 806, the orientation of the active user's head is determined by the head-controlled device 100. The frame obtained at step 802 is processed by the computer vision system to detect at least a value of a first head rotation (e.g., a yaw, pitch, or roll angle value) of the orientation of the user's head 300 in the frame. In some examples, the frame is also processed by the computer vision system to detect values of one or more additional head rotations, such as a second head rotation (e.g., a yaw, pitch, or roll angle value) of the head 300. The computer vision system may use known head tracking techniques to determine the orientation of the user's head 300 in the frame.

At 808, the head-controlled device 100 processes the value of the first head rotation and a corresponding first input-output map 210 (i.e. an I/O map 210 of the first head rotation, such as yaw, to a coordinate of the output space, generated at stage 708) to compute a selected output range of the first input-output map. Thus, for example, a yaw angle of the head 300 determined at step 806 is mapped, via a yaw-to-horizontal-coordinate I/O map 210 generated at stage 708, to a corresponding horizontal coordinate value of the output space. The resulting horizontal coordinate value is determined to fall within a horizontal coordinate value range, such as a horizontal coordinate value range corresponding to a GUI element. The horizontal coordinate range is referred to as the selected output range.

At 810, optionally, the head-controlled device 100 processes the value of the second head rotation and a corresponding second input-output map 210 (i.e. an I/O map 210 of the second head rotation, such as pitch, to a coordinate of the output space, generated at stage 708) to compute a selected output range of the second input-output map. Thus, for example, a pitch angle of the head 300 determined at step 806 is mapped, via a pitch-to-vertical-coordinate I/O map 210 generated at stage 708, to a corresponding vertical coordinate value of the output space.

At 812, in response to identifying the first selected output range at step 808 and/or the second selected output range at step 810, the head-controlled device 100 executes a selected function of the head-controlled device 100. The selected function is selected from a plurality of functions based on the selected output range of the first input-output map 210, and optionally also based on the selected output range of the second input-output map 210 (and/or a selected output range of a third input-output map 210, for example an I/O map 210 mapping head roll to a depth dimension in a VR or AR environment). The plurality of functions may be software commands (encoded in the instructions 230) associated with various GUI elements of the GUI, as indicated by the GUI information 212, such that a plurality of GUI elements of the GUI correspond to a plurality of functions and the selected function corresponds to a selected GUI element. In an illustrative example, the GUI is horizontal GUI 600, and is used to control a music player software application (included in the instructions 230), then the left-most GUI element, GUI 1 602, may be associated (as indicated by the GUI information 212) with a "previous music track" function. The first head rotation value (i.e. yaw) is determined to be −20 degrees, and the yaw-to-horizontal-coordinate I/O map 210 maps a yaw of −20 degrees to an output space horizontal coordinate value of (pixel X coordinate=18). GUI 1 602 has a center location, with respect to the horizontal coordinate, of (pixel X coordinate=22) and a span, with respect to the horizontal coordinate, of (22 pixels). Therefore, the selected output range corresponding to the head rotation value, as determined using the I/O map 210, is the output range of GUI 1 602, resulting in the function associated with GUI 1 ("previous music track") being selected and thereby executed by the head-controlled device 100.

It will be appreciated, in examples using more than one output space coordinate to navigate the GUI (such as grid GUI 630), that the first selected output range (e.g. horizontal coordinate, indicating a column) and second selected output range (e.g. vertical coordinate, indicating a row) musty both be determined in order to identify the selected GUI element. Furthermore, in some examples, the set of first output ranges and set of second output ranges may be determined dependent upon each other: thus, for example, a GUI that includes partially overlapping or partially offset GUI elements in two dimensions may require that the horizontal coordinate value X be determined first (thereby indicating a pixel column), and the selected GUI element is identified based on the horizontal coordinate value X and the vertical coordinate value Y by moving down the pixel column to the pixel row identified by the vertical coordinate Y, then identifying the selected GUI element as a GUI element displayed at the coordinates (X,Y).

In some embodiments, selecting a GUI element using head orientation results in execution of a function that only provide UI feedback to the user. For example, the selected function associated with the selected GUI element, when executed by the head-controlled device, causes the selected GUI element to be displayed on the display screen with a changed appearance. Thus, at step 812 the selected GUI element GUI 1 602 may be displayed on the display 104 with a changed appearance, e.g. a "highlighted" or "selected" appearance.

The method 700 may then proceed to step 814 to receive further user input. The further user input may include blink input (i.e. detecting a blink movement of the user's eyes using frames obtained by the camera 102), voice input (i.e. detecting voice commands issued by the user using a microphone in communication with the head-controlled device 100 and processed by a voice recognition system of the head-controlled device 100), gesture input (i.e. detecting a movement of the user's hands or head using frames obtained by the camera 102, such as a nodding movement of the head), dwell input (i.e. detecting that the user's head remains in an orientation mapped to the selected GUI element for a predetermined period of time), and/or any other type of user input. In some examples, further user input may include conventional user input received through a mouse, keyboard, touchpad, touchscreen, or other user input device. The further user input is intended to indicate that the user wishes to launch or execute a further function associated with the currently-selected GUI element. In some embodiments, head gesture input may be head movement input consisting of rotational movement of the user's head with respect to a second head rotation (e.g., pitch) orthogonal to the first head rotation (e.g., yaw) used to select the GUI element (e.g., in a horizontal GUI 600). Thus, in the context of a horizontal GUI 600, the GUI element may be selected based on head yaw, and a nodding head gesture (i.e. movement of the head with respect to pitch) may be used to activate the GUI element.

At 816, in response to receiving the further user input, the head-controlled device 100 executes a further function of the head-controlled device 100. The further function is selected from the plurality of functions based on the selected output range of the first input-output map 210 (and/or the output ranges of one or more additional input/output maps 210 as described above) and the further user input. Thus, in the illustrative example above, the further user input may consist of blink input. After executing the function associated with GUI 1 602, namely a function executable to change the appearance of GUI 602 to a "highlighted" appearance, the camera 102 is used to obtain a further sequence of frames. Based on the further sequence of frames, the computer vision system determines that the user has blinked his or her eyes. In response, the head-controlled device 100 executes a further selected function associated with GUI 1 602 and with the eye blink action, namely a function executable to perform the "play previous track" software command of the music player software application.

In some examples, the method 700 may return to an earlier step of the I/O map generation stage 708 one or more times during the real-time HCI stage 718. For example, as shown in FIG. 8, the method 700 may return to the initialization step 712 after each frame is processed, or at some other interval or in response to some other condition during the HCI session, in order to determine whether the context has changed. For example, if the user's body 403 moves relative to the display 104, the body position information 22 may be re-determined, thereby resulting a re-generation of the I/O map(s) 210 to be applied during the next iteration of the HCI session loop (e.g., steps 802 through 812 or 802 through 816). Thus, the head-controlled device 100 may adapt to changing context to generate and apply I/O maps 210 that optimize the input efficiency of the user's head movements based on expected selection error values 502 at different portions of the user's head's range of motion.

Figure 9:
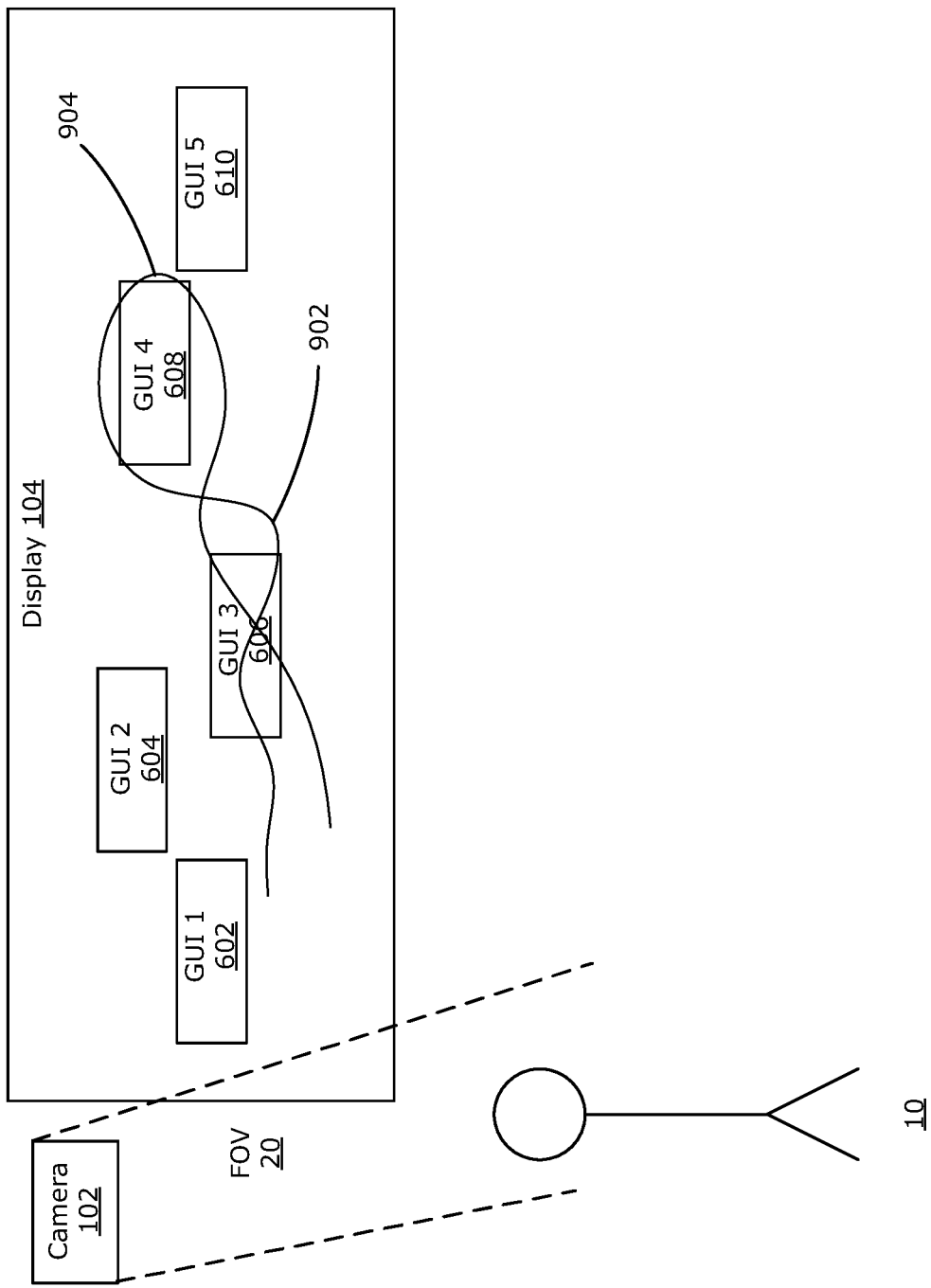
FIG. 9 is a block diagram illustrating a user interacting with an example head-controlled device to select a GUI element using a looping head gesture, according to examples described herein.

FIG. 9 shows a user 10 interacting with an example head-controlled device 100 to select a GUI element (GUI 4 608) using a looping head gesture. The looping head gesture may be used as a further user input indicating a desire to execute the further function associated with the selected GUI element, i.e. GUI 4 608. The orientation of the user's head is tracked over a sequence of frames obtained from the camera 102, as described above, during a head-based HCI session when the head-controlled device 100 is in head control mode. Two I/O maps 210 are used to map the user's yaw and tilt head rotations to horizontal and vertical coordinates, respectively, of the output space of the display 104. The resulting output space path 902 traversed by the direction of the user's head is tracked by the head-controlled device 100, and if a looping pattern 904 is detected in the path 902, instructions 230 are executed that determine whether the looping pattern 904 is sufficiently associated with the output space ranges of a given GUI element. In this example, the looping pattern 904 of the path 902 is sufficiently associated with a horizontal coordinate range and a vertical coordinate range of GUI 4 608 (e.g., the left and right limits of the looping pattern 904 enclose the left and right edges of the horizontal coordinate range, and the top and bottom limits of the looping pattern 904 enclose the top and bottom edges of the vertical coordinate range of GUI 4 608). Thus, in response to detecting the looping pattern 904, the head-controlled device 100 may execute the selected function (e.g., changing the appearance of GUI 4 608) and/or the further selected function (e.g., a further command associated with GUI 4 608).

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for controlling a device based on an orientation of a user's head, the method comprising:
   obtaining a first input-output map indicating, for each input range of a plurality of input ranges, a corresponding output range, each input range comprising a continuous range of values of a first head rotation, each output range comprising a continuous range of values of a first coordinate of an output space, each input range having a span based on an expected selection error value for the input range, the continuous range of values of the first head rotation of a first of the input ranges being smaller than the continuous range of values of the first head rotation of a second of the input ranges that is further from a neutral head position than the first of the input ranges, the output range corresponding with the first of the input ranges being equal in size to the output range corresponding to the second of the input ranges;

receiving a frame captured by a camera;

processing the frame to detect a value of the first head rotation of the orientation of the user's head in the frame;

processing the value of the first head rotation and the first input-output map to compute a selected output range of the first input-output map; and executing a selected function of the device, the selected function being selected from a plurality of functions based on the selected output range of the first input-output map.

2. The method of claim 1, wherein:

each output range corresponds to a respective GUI element of a plurality of GUI elements displayed on a display screen of the device, such that a selected GUI element corresponds to the selected output range of the first input-output map; and the plurality of GUI elements correspond to the plurality of functions, such that the selected function corresponds to the selected GUI element.

3. The method of claim 1:

wherein the selected function, when executed by the device, causes the selected GUI element to be displayed on a display screen with a changed appearance;

the method further comprising:

receiving further input, the further input including at least one of the following:
blink input;
voice input;
gesture input; and
head movement input, comprising rotational movement of the user's head with respect to a second head rotation orthogonal to the first head rotation; and in response to receiving the further input, executing a further function of the device, the further function being selected from the plurality of functions based on the selected output range of the first input-output map and the further input.

4. The method of claim 1, further comprising:

receiving a plurality of additional frames captured by a camera;

for each additional frame of the plurality of additional frames:

processing the additional frame to detect a respective value of the first head rotation of the orientation of the user's head in the additional frame; and processing the respective value of the first head rotation and the first input-output map to compute a respective selected output range of the first input-output map; and identifying, based on the selected output range of the first input-output map and the respective selected output range of the first input-output map for each additional frame of the plurality of additional frames, a looping pattern of the user's head with respect to a selected GUI element of a plurality of GUI elements displayed on a display screen of the device;

wherein the selected function is selected from the plurality of functions based on the selected GUI element.

5. The method of claim 1, wherein:

the first head rotation is yaw; and the first coordinate is a horizontal coordinate defined relative to the output space.

6. The method of claim 5, further comprising:

obtaining a second input-output map indicating, for each input range of a plurality of input ranges, a corresponding output range, each input range comprising a range of values of a second head rotation, the second head rotation being pitch;

each output range comprising a range of values of a second coordinate of an output space, the second coordinate being a vertical coordinate defined relative to the output space, each input range having a span based on an expected selection error value for the input range;

processing the frame to detect a value of the second head rotation of the orientation of the user's head in the frame; and processing the value of the second head rotation and the second input-output map to compute a selected output range of the second input-output map;

wherein the selected function is selected from the plurality of functions based on the selected output range of the first input-output map and the selected output range of the second input-output map.

7. The method of claim 1, wherein:

the first head rotation is pitch; and the first coordinate is a vertical coordinate defined relative to the output space.

8. The method of claim 1, wherein:

the expected selection error value for each input range is positively correlated with an angular distance of the input range from a neutral orientation of the head.

9. The method of claim 1, further comprising:

receiving GUI design information indicating, for each GUI element of a plurality of GUI elements:

an input range corresponding to the GUI element, the input range having a span based on the expected selection error value for the input range; and processing the GUI design information to generate the first input-output map.

10. The method of claim 1, further comprising:

receiving GUI design information indicating a plurality of GUI elements ordered sequentially with respect to the first coordinate of the output space;

receiving error information indicating a relationship between expected selection error values and values of the first head rotation; and processing the GUI design information and the error information to generate the first input-output map such that:

the output space is segmented into the plurality of output ranges, each output range corresponding to a GUI element of the plurality of GUI elements; and the span of each input range of the first input-output map is based on the relationship between expected selection error values and values of the first head rotation.

11. The method of claim 1, wherein obtaining the first input-output map comprises:
obtaining context information, comprising:
user body orientation information indicating an orientation of the user's body;
range of motion information indicating at least one range of motion for the user's head; and
processing the context information to generate the first input-output map.

12. The method of claim 1, wherein obtaining the first input-output map comprises calibrating the first input-output map by:
presenting, via an output device, a prompt to perform one or more head-pointing exercises;
receiving a plurality of calibration frames captured by the camera;
processing the plurality of calibration frames to calibrate the first input-output map.

13. A device comprising:
a processor device; and
a memory storing machine-executable instructions thereon which, when executed by the processor device, cause the device to:
obtain a first input-output map indicating, for each input range of a plurality of input ranges, a corresponding output range,
each input range comprising a continuous range of values of a first head rotation,
each output range comprising a continuous range of values of a first coordinate of an output space,
each input range having a span based on an expected selection error value for the input range,
the continuous range of values of the first head rotation of a first of the input ranges being smaller than the continuous range of values of the first head rotation of a second of the input ranges that is further from a neutral head position than the first of the input ranges, the output range corresponding with the first of the input ranges being equal in size to the output range corresponding to the second of the input ranges;
receive a frame captured by a camera;
process the frame to detect a value of the first head rotation of an orientation of the user's head in the frame;
process the value of the first head rotation and the first input-output map to compute a selected output range of the first input-output map; and
execute a selected function of the device, the selected function being selected from a plurality of functions based on the selected output range of the first input-output map.

14. The device of claim 13, further comprising:
the camera; and
a display.

15. The device of claim 14, wherein the machine-executable instructions, when executed by the processor device, further cause the device to:
each output range corresponds to a respective GUI element of a plurality of GUI elements displayed on a display screen of the display, such that a selected GUI element corresponds to the selected output range of the first input-output map; and
the plurality of GUI elements correspond to the plurality of functions, such that the selected function corresponds to the selected GUI element.

16. The device of claim 15, wherein:
the selected function, when executed by the device, causes the selected GUI element to be displayed on the display screen with a changed appearance.

17. The device of claim 16, wherein the machine-executable instructions, when executed by the processor device, further cause the device to:
receive further input, the further input including at least one of the following:
blink input;
voice input;
gesture input; and
head movement input, comprising rotational movement of the user's head with respect to a second head rotation orthogonal to the first head rotation; and
in response to receiving the further input, execute a further function of the device, the further function being selected from the plurality of functions based on the selected output range of the first input-output map and the further input.

18. The device of claim 13, wherein:
the first head rotation is yaw; and
the first coordinate is a horizontal coordinate defined relative to the output space;
the machine-executable instructions, when executed by the processor device, further cause the device to:
obtain a second input-output map indicating, for each input range of a plurality of input ranges, a corresponding output range,
each input range comprising a range of values of a second head rotation, the second head rotation being pitch;
each output range comprising a range of values of a second coordinate of an output space, the second coordinate being a vertical coordinate defined relative to the output space,
each input range having a span based on an expected selection error value for the input range;
process the frame to detect a value of the second head rotation of the orientation of the user's head in the frame; and
process the value of the second head rotation and the second input-output map to compute a selected output range of the second input-output map; and
the selected function is selected from the plurality of functions based on the selected output range of the first input-output map and the selected output range of the second input-output map.

19. A non-transitory processor-readable medium having machine-executable instructions stored thereon which, when executed by a processor device of a device, cause the device to:
obtain a first input-output map indicating, for each input range of a plurality of input ranges, a corresponding output range,
each input range comprising a continuous range of values of a first head rotation,
each output range comprising a continuous range of values of a first coordinate of an output space,
each input range having a span based on an expected selection error value for the input range,
the continuous range of values of the first head rotation of a first of the input ranges being smaller than the continuous range of values of the first head rotation of a second of the input ranges that is further from a neutral head position than the first of the input ranges, the output range corresponding with the first of the input ranges being equal in size to the output range corresponding to the second of the input ranges;

receive a frame captured by a camera;

process the frame to detect a value of the first head rotation of an orientation of a user's head in the frame;

process the value of the first head rotation and the first input-output map to compute a selected output range of the first input-output map; and execute a selected function of the device, the selected function being selected from a plurality of functions based on the selected output range of the first input-output map.

* * * * *